(12) United States Patent
Kim et al.

(10) Patent No.: US 10,419,985 B2
(45) Date of Patent: Sep. 17, 2019

(54) METHOD OF SUPPORTING ACCESS NETWORK HANDOVER OPERATION OF USER EQUIPMENT IN WIRELESS COMMUNICATION SYSTEM AND APPARATUS FOR THE SAME

(71) Applicant: LG ELECTRONICS INC., Seoul (KR)

(72) Inventors: Dongsoo Kim, Seoul (KR); Jinsook Ryu, Seoul (KR); Myungjune Youn, Seoul (KR); Hyunsook Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 258 days.

(21) Appl. No.: 15/445,449

(22) Filed: Feb. 28, 2017

(65) Prior Publication Data

US 2018/0115928 A1    Apr. 26, 2018

Related U.S. Application Data

(60) Provisional application No. 62/412,801, filed on Oct. 25, 2016.

(51) Int. Cl.
*H04W 36/00* (2009.01)
*H04W 36/14* (2009.01)
*H04W 76/12* (2018.01)

(52) U.S. Cl.
CPC ... *H04W 36/0061* (2013.01); *H04W 36/0033* (2013.01); *H04W 36/14* (2013.01); *H04W 76/12* (2018.02)

(58) Field of Classification Search
CPC .................................. H04W 36/0061
See application file for complete search history.

(56) References Cited

U.S. PATENT DOCUMENTS

| 2011/0075675 | A1* | 3/2011 | Koodli | H04L 12/14 370/401 |
| 2016/0254991 | A1* | 9/2016 | Eckert | H04L 12/4633 370/225 |
| 2018/0097657 | A1* | 4/2018 | Dao | H04L 12/4633 |
| 2018/0097894 | A1* | 4/2018 | Li | H04L 47/14 |

* cited by examiner

*Primary Examiner* — Samina F Choudhry
(74) *Attorney, Agent, or Firm* — Lee Hong Degerman Kang Waimey

(57) ABSTRACT

Provided method includes receiving, from the source AN, a handover request requesting a handover of an AN of the user equipment, wherein the user equipment is configured with a per node level tunnel for connection to a target user plane function node, and wherein the per node level tunnel is a common connection tunnel which is generated in the node unit for all traffics between the target AN and the target user plane function node, determining whether a service provision through the per node level tunnel is possible, determining whether generation of a new per node level tunnel for the user equipment is necessary when it is determined that service provision is impossible, and generating the new per node level tunnel for the user equipment based on a result of the determination or changing the tunnel model of the user equipment to a different tunnel model.

15 Claims, 12 Drawing Sheets

【Fig. 1】
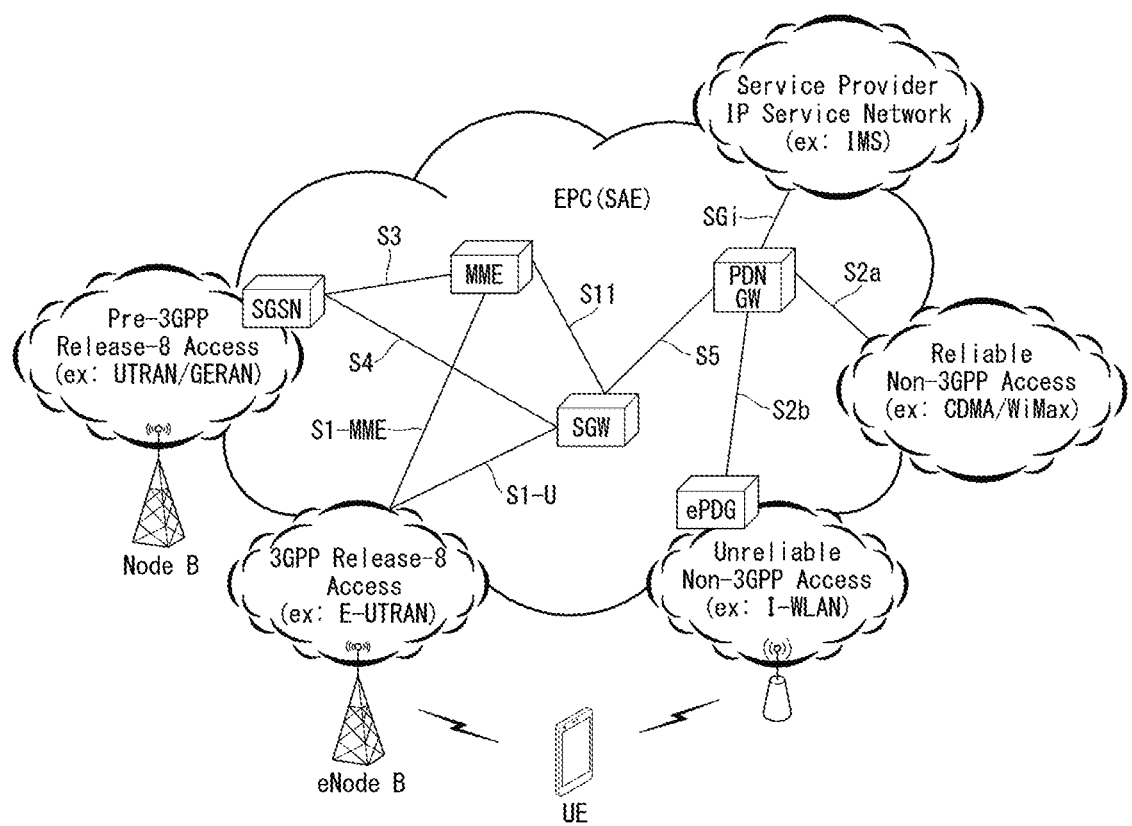

【Fig. 2】
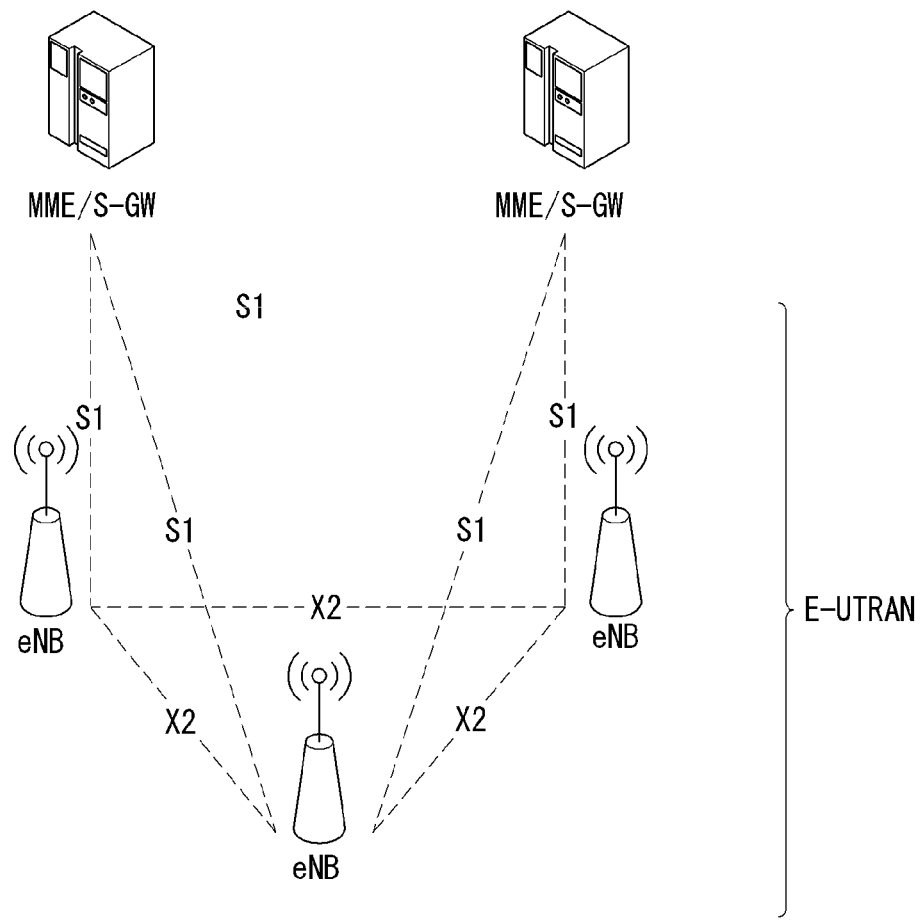

[Fig. 3]
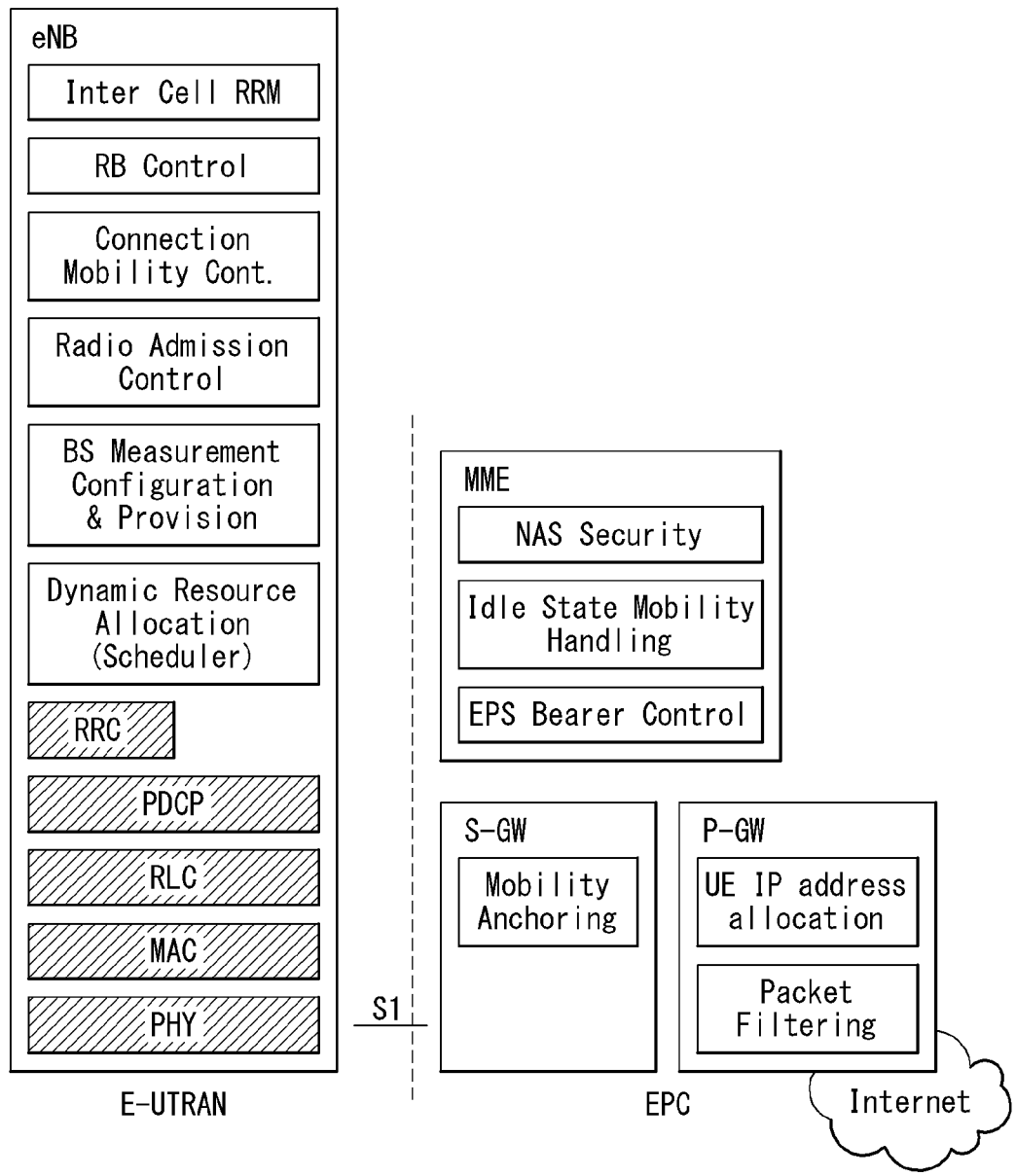

【Fig. 4】
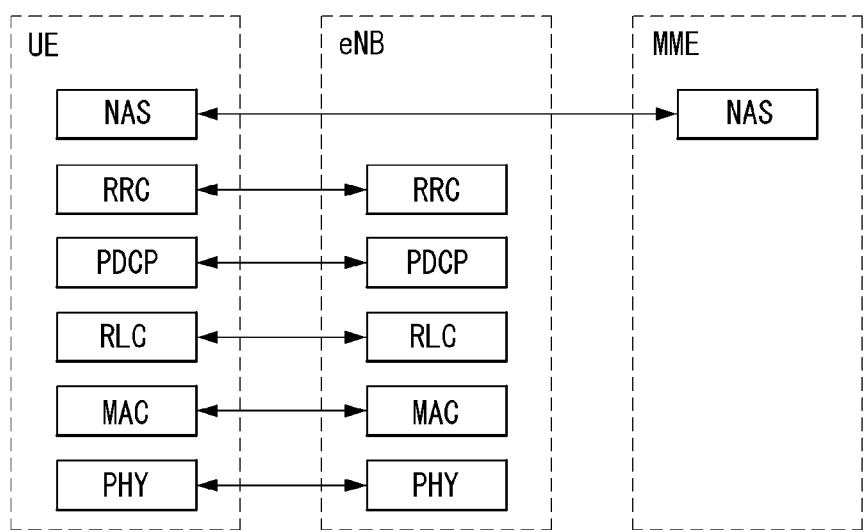
(a) Control Plane Protocol Stack
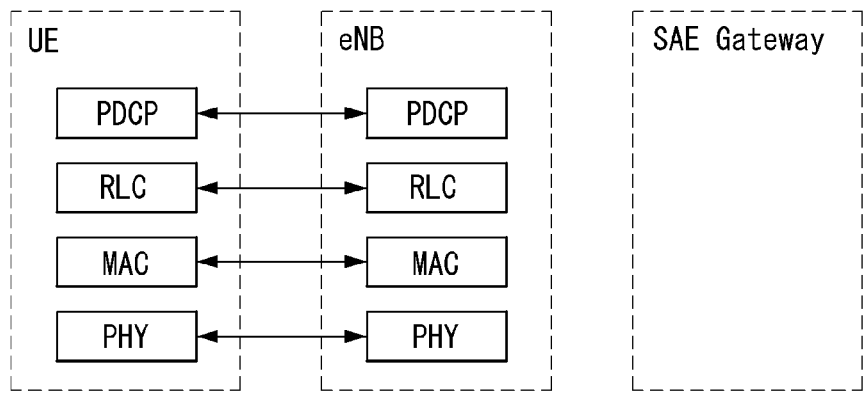
(b) User Plane Protocol Stack 【Fig. 5】
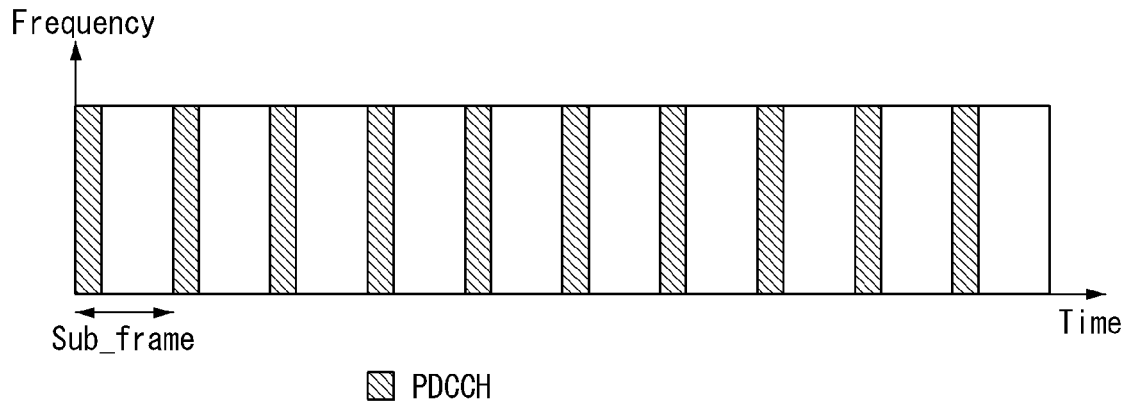
【Fig. 6】
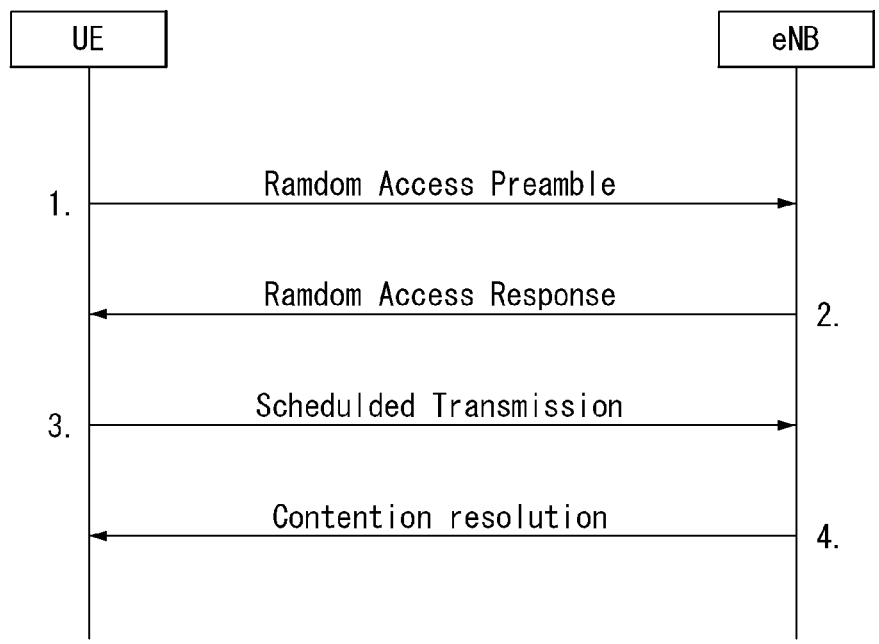

[Fig. 7]
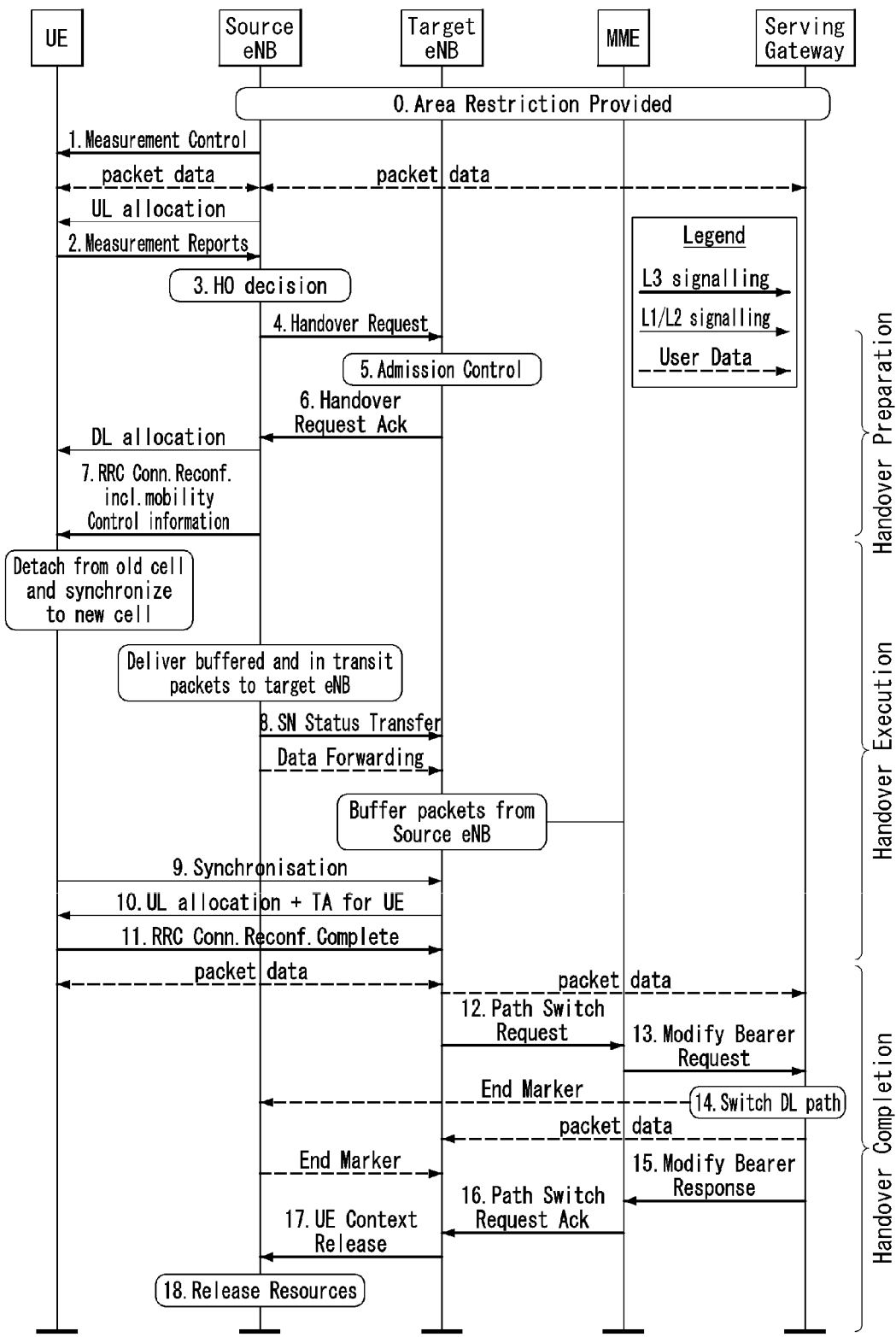

【Fig. 8】
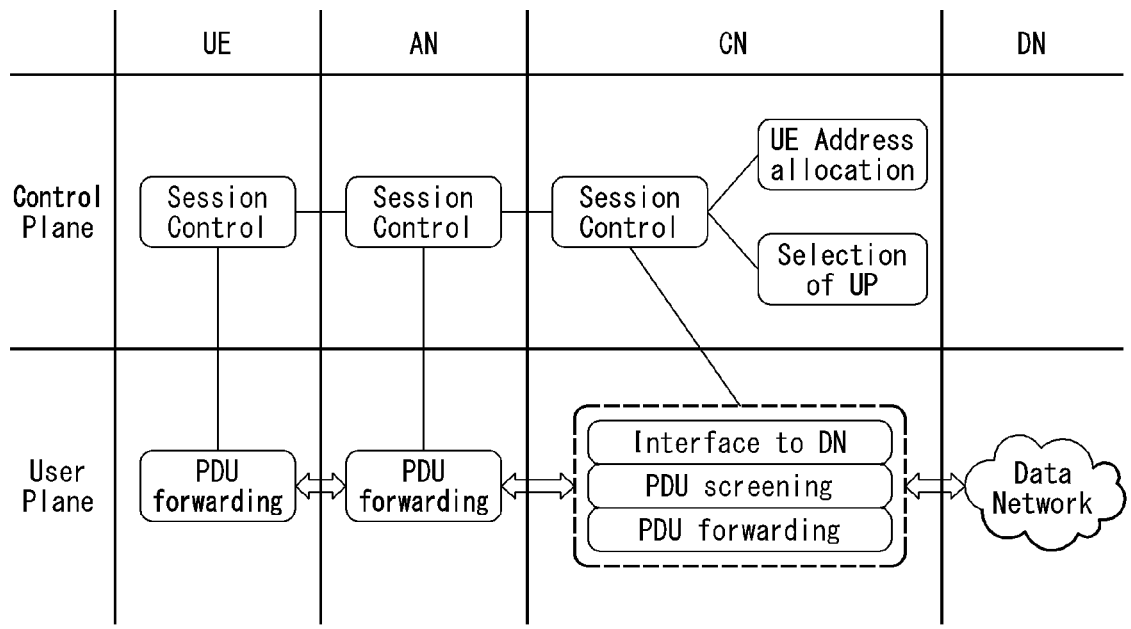
【Fig. 9】
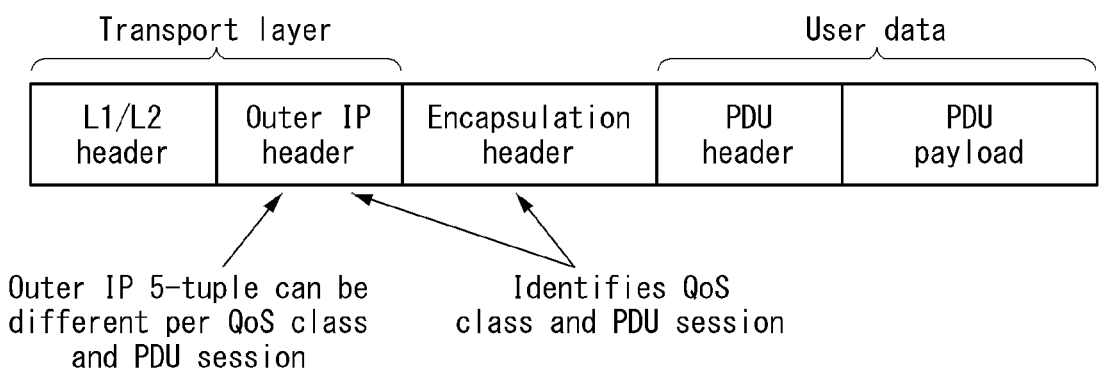

[Fig. 10]
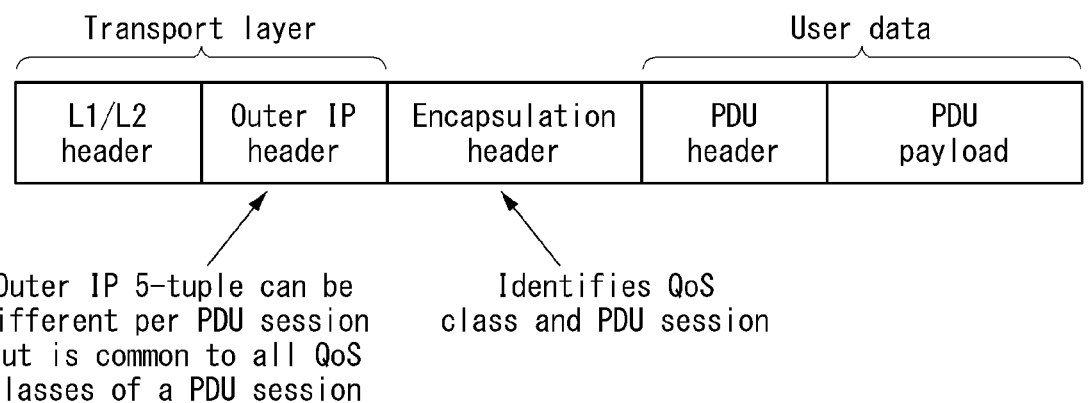
[Fig. 11]
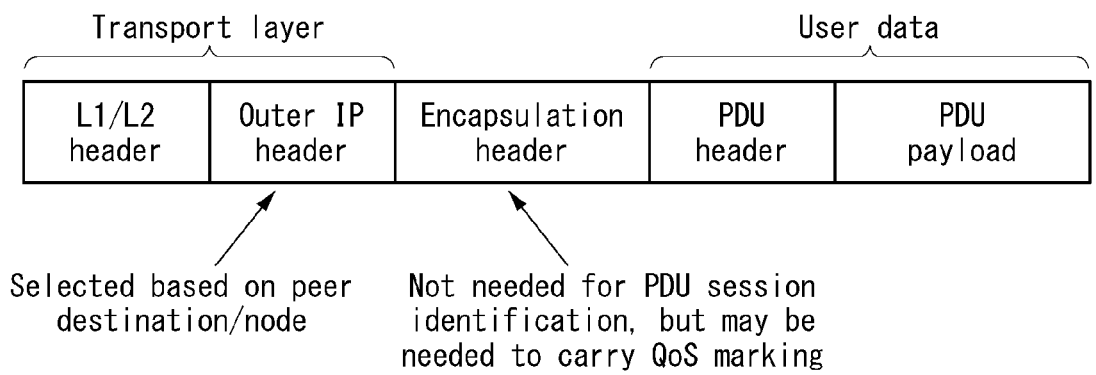

【Fig. 12】
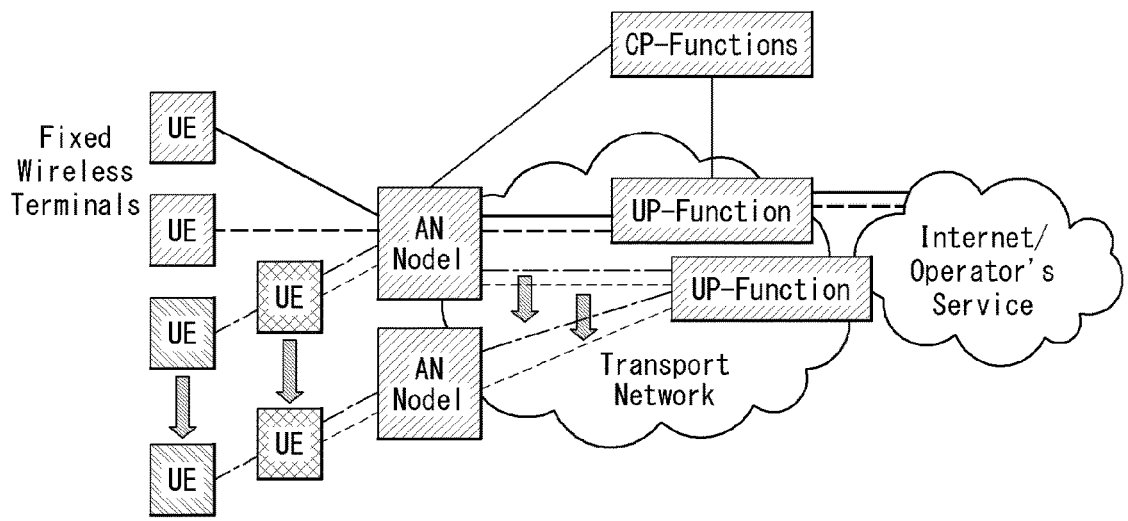
【Fig. 13】
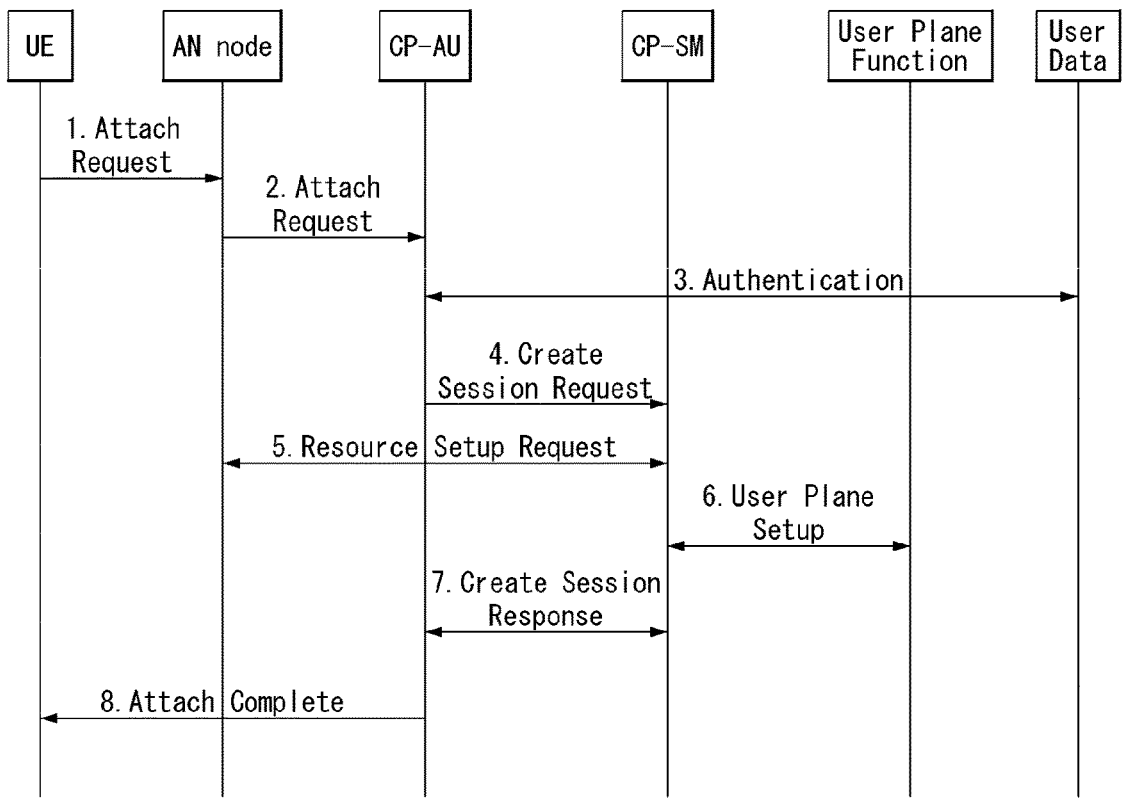

【Fig. 14】
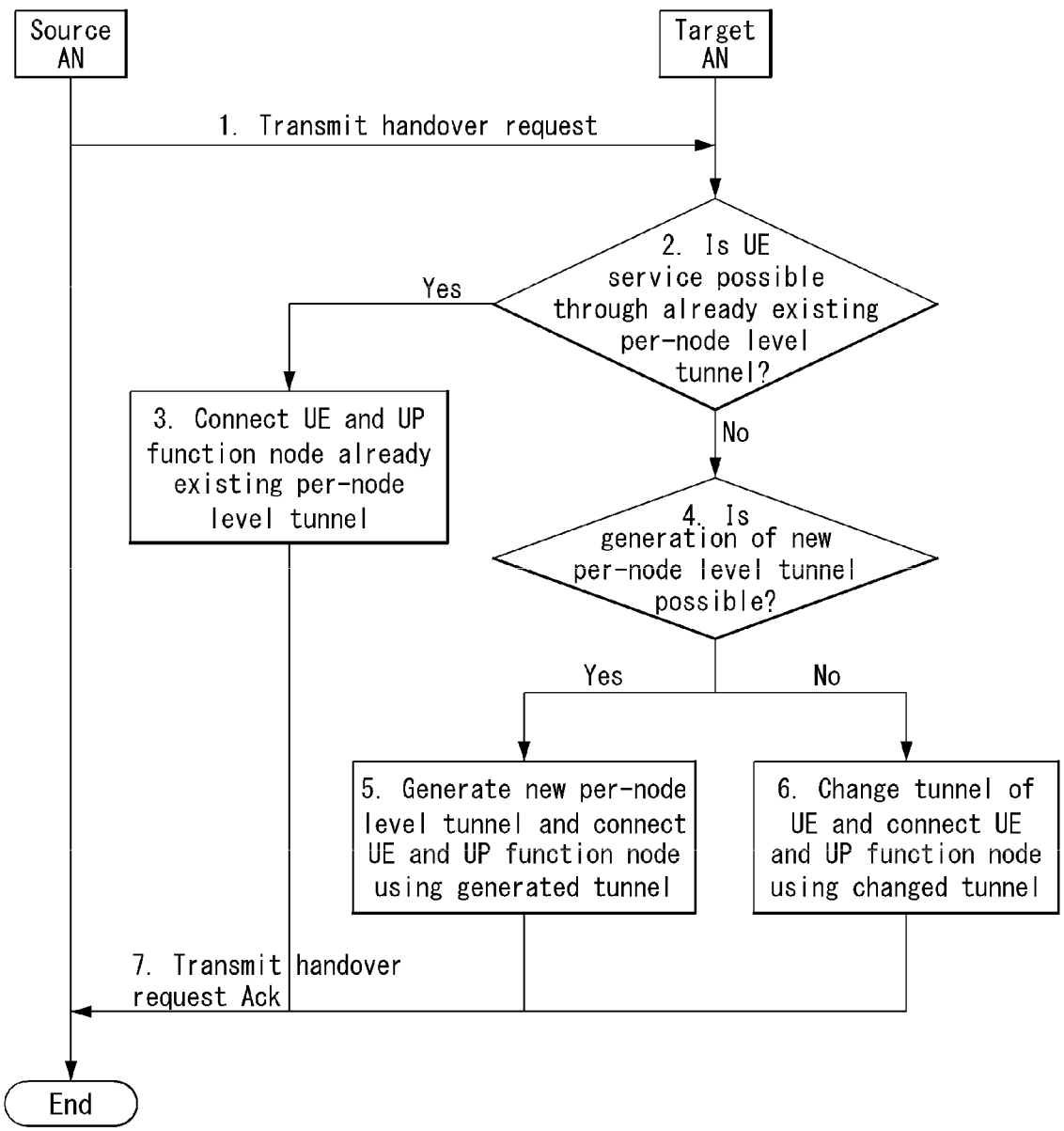

【Fig. 15】
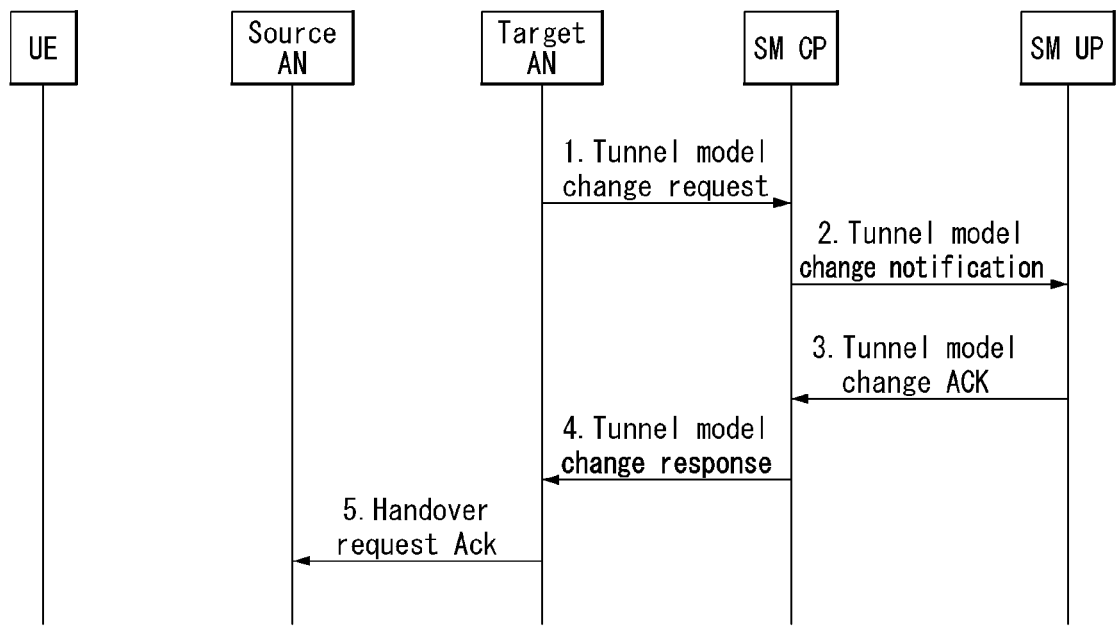
【Fig. 16】
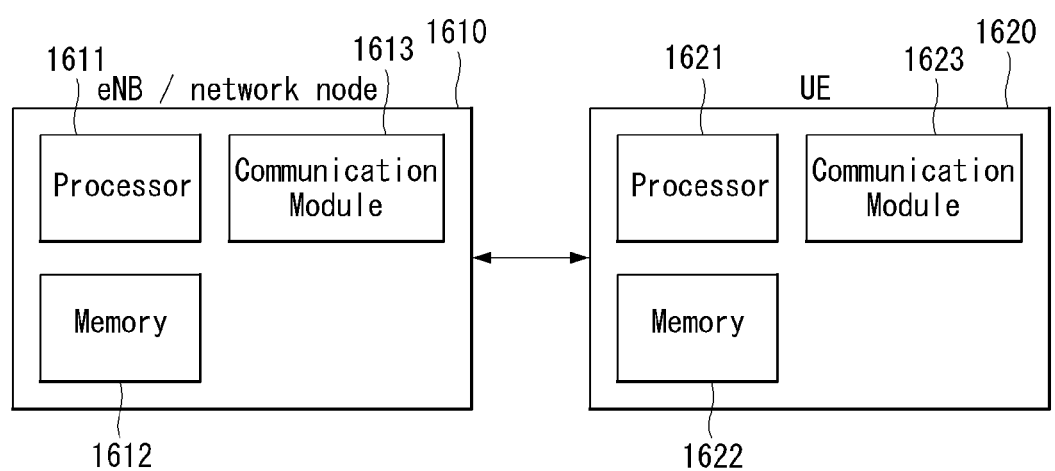

[Fig. 17]
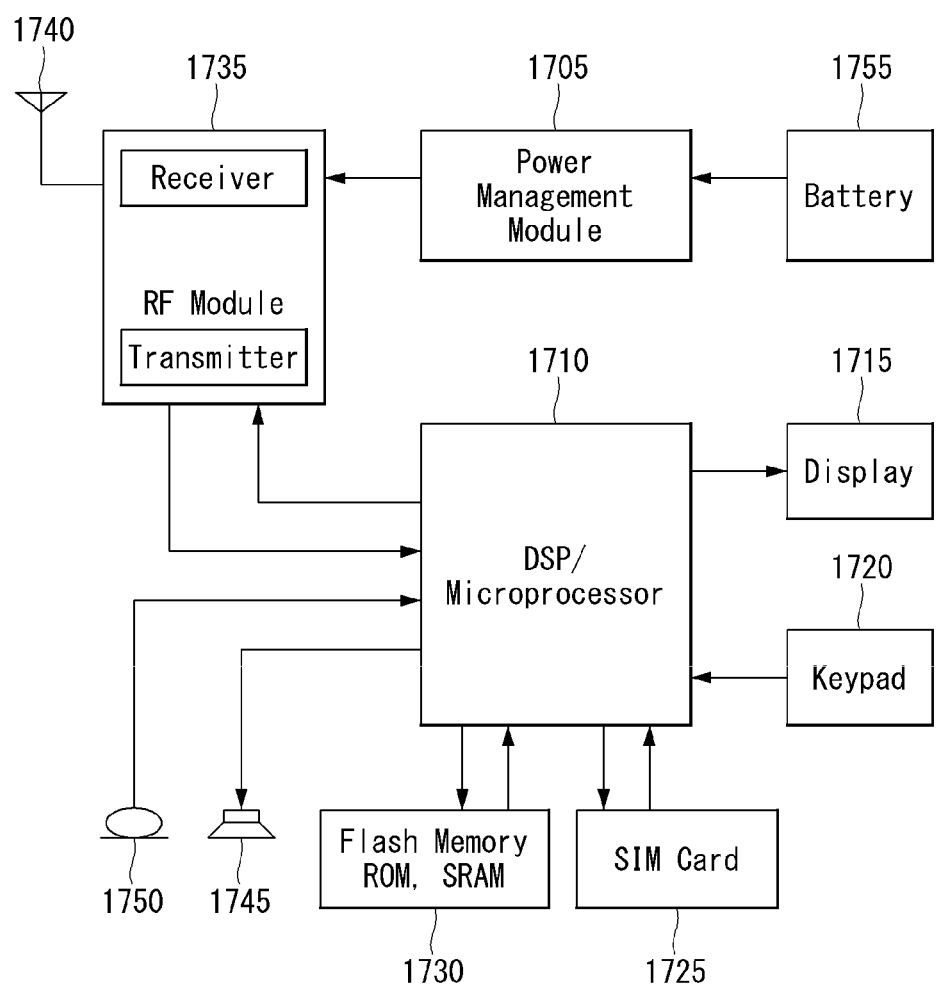

METHOD OF SUPPORTING ACCESS NETWORK HANDOVER OPERATION OF USER EQUIPMENT IN WIRELESS COMMUNICATION SYSTEM AND APPARATUS FOR THE SAME

CROSS-REFERENCE TO RELATED APPLICATIONS

Pursuant to 35 U.S.C. § 119(e), this application claims the benefit of U.S. Provisional Patent Application No. 62/412,801, filed on Oct. 25, 2016, the contents of which are hereby incorporated by reference herein in its entirety.

BACKGROUND OF THE INVENTION

Field of the Invention

The present invention relates to a wireless communication system, and more particularly, to a method of supporting an access network (AN) handover operation in a wireless communication system and apparatus for the same.

Related Art

A mobile communication system has been developed to provide a voice service while guaranteeing user mobility. However, the mobile communication system has been extended to a service range to a data service as well as a voice service, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection devices number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), super wideband support, and device networking have been researched.

SUMMARY OF THE INVENTION

An object of the present invention is to propose appropriate criteria for determining whether to generate a new tunnel for a user equipment (UE) by a new access network (AN) (or a target AN) to change a tunnel model of a UE in order to reuse an already generated tunnel when a mobility event of the UE is generated.

The technical problems of the present invention are not limited to the above-described technical problems and the other technical problems will be understood by those skilled in the art from the following description.

In an aspect, a method for supporting an access network (AN) handover operation of a user equipment by a target AN includes receiving, from the source AN, a handover request requesting a handover of an AN of the user equipment from a source AN to the target AN, wherein the user equipment is configured with a per node level tunnel for connection to a target user plane function node is set as a per node level tunnel and wherein the per node level tunnel is a common connection tunnel which is generated in the node unit for all traffics between the target AN and the target user plane function node, determining whether a service provision through the per node level tunnel is possible for the user equipment, determining whether generation of a new per node level tunnel for the user equipment is necessary when it is determined that service provision is impossible using the per node level tunnel, and generating the new per node level tunnel for the user equipment based on a result of the determination or changing the tunnel model of the user equipment to a different tunnel model other than the per node level tunnel.

The determining of whether a service provision through the per node level tunnel is possible for the user equipment may include determining whether a pre-generated per node level tunnel for the target user plane function node exists and, if there is the per node level tunnel, checking a number of remaining user equipments which are currently supportable by the per node level tunnel.

The determining of whether generation of the new per node level tunnel for the user equipment is necessary may include making a determination based on a feature of a packet data unit (PDU) session between the user equipment and the target user plane function node.

The making of a determination based on a feature of a packet data unit (PDU) session between the user equipment and the target user plane function node may include, if the PDU session between the user equipment and the target user plane function node is a delay tolerant session allowing a delay longer than a preset time, determining that generation of the new per node level tunnel is necessary.

The determining of whether generation of the new per node level tunnel for the user equipment is necessary may include making a determination based on a location including the target AN.

The making of the determination based on the location including the target AN may include, if the location including the target AN corresponds to a location supporting the per node level tunnel, determining that generation of the new per node level tunnel is necessary and, if the location including the target AN does not correspond to a location not supporting the per node level tunnel, determining that generation of the new per node level tunnel is not necessary.

The different tunnel model may correspond to a per-session level tunnel which is a common connection tunnel which is generated in PDU session unit between the target AN and the target user plane function node or a per-QoS (quality of services) class level tunnel which is a common connection tunnel which is generated in QoS class unit between the target AN and the target user plane function node.

The changing of the tunnel model of the user equipment to a different tunnel model other than the per node level tunnel may include transmitting a tunnel model change request requesting a change to the different tunnel model to a session management (SM) control plane (CP) and receiving a tunnel model change response indicating completion of a change to the different tunnel model, from the SM CP.

The tunnel model change request may include identification information of the user equipment, information of PDU session which needs a change to the different tunnel model and/or information on tunnels having been generated between the target AN and the target user plane function node.

The method may further include connecting the user equipment and the target user plane function node through a new per node level tunnel if the new per node level tunnel for the user equipment is generated based on a result of the determination.

The method may further include transmitting, to the source AN, a handover request Ack (acknowledge) indicating completion of a handover to the target AN.

In another aspect, a target access network (AN) supporting an AN handover operation of a user equipment in a wireless communication system includes a communication module for transmitting and receiving a signal and a processor for controlling the communication module, wherein the processor is configured to receive, from the source AN, a handover request requesting a handover of an AN of the user equipment from a source AN to the target AN, wherein the user equipment is configured with a per node level tunnel for connection to a target user plane function node, and wherein the per node level tunnel is a common connection tunnel which is generated in the node unit for all traffics between the target AN and the target user plane function node, determine whether a service provision through the per node level tunnel is possible for the user equipment, determine whether generation of a new per node level tunnel for the user equipment is necessary when it is determined that service provision is impossible using the per node level tunnel, and generate the new per node level tunnel for the user equipment based on a result of the determination or change the tunnel model of the user equipment to a different tunnel model other than the per node level tunnel.

The processor may be configured to make a determination based on a feature of a packet data unit (PDU) session between the user equipment and the target user plane function node.

The processor may be configured, if the PDU session between the user equipment and the target user plane function node is a delay tolerant session allowing a delay longer than a preset time, to determine that generation of the new per node level tunnel is necessary.

The processor may be configured to determine whether generation of the new per node level tunnel for the user equipment based on a location including the target AN.

The processor may be configured, if the location including the target AN corresponds to a location supporting the per node level tunnel, to determine that generation of the new per node level tunnel is necessary and if the location including the target AN does not correspond to a location not supporting the per node level tunnel, to determine that generation of the new per node level tunnel is not necessary.

BRIEF DESCRIPTION OF THE DRAWINGS

For understanding of the present invention, the attached drawings included as a portion of a detailed description provide an exemplary embodiment of the present invention and describe a technical characteristic of the present invention together with a detailed description.

FIG. 1 illustrates an Evolved Packet System (EPS) to which the present invention can be applied.

FIG. 2 illustrates an example of a structure of an evolved universal terrestrial radio access network (E-UTRAN) to which the present invention can be applied.

FIG. 3 illustrates a structure of an E-UTRAN and an EPC in a wireless communication system to which the present invention can be applied.

FIG. 4 illustrates a radio interface protocol structure between a UE and an E-UTRAN in a wireless communication system to which the present invention can be applied.

FIG. 5 illustrates a structure of a physical channel in a wireless communication system to which the present invention can be applied.

FIG. 6 illustrates a contention-based random access procedure in a wireless communication system to which the present invention can be applied.

FIG. 7 illustrates an intra-MME/Serving Gateway HO(Handover) procedure.

FIG. 8 illustrates Session management functions in a wireless communication system to which the present invention can be applied.

FIG. 9 illustrates Per QoS class tunnel protocol in a wireless communication system to which the present invention can be applied.

FIG. 10 illustrates Per PDU session tunnel protocol in a wireless communication system to which the present invention can be applied.

FIG. 11 illustrates One tunnel per destination in a wireless communication system to which the present invention can be applied.

FIG. 12 illustrates Scenario with fixed wireless and mobile terminals in a wireless communication system to which the present invention can be applied.

FIG. 13 illustrates a UE attach to the network by an AN node-level tunnel in a wireless communication system to which the present invention can be applied.

FIG. 14 is a flowchart illustrating a method of supporting an access network (AN) handover operation by a target AN according to an embodiment of the present invention.

FIG. 15 is a flowchart illustrating a method of changing a tunneling model of a target AN according to an embodiment of the present invention.

FIG. 16 is a block diagram illustrating a configuration of a communication device according to an exemplary embodiment of the present invention.

FIG. 17 is a block diagram illustrating a configuration of a communication device according to an exemplary embodiment of the present invention.

DESCRIPTION OF EXEMPLARY EMBODIMENTS

Hereinafter, an exemplary embodiment of the present invention will be described in detail with reference to the attached drawings. A detailed description of the present invention to be described hereinafter together with the attached drawings describes an exemplary embodiment of the present invention and does not represent a sole embodiment in which the present invention may be executed. The following detailed description includes detailed contents in order to provide complete understanding of the present invention. However, a person of ordinary skill in the art knows that the present invention may be executed without such detailed contents.

In several cases, in order to avoid a concept of the present invention from being ambiguous, well-known structures and devices may be omitted or a core function of each structure and device may be mainly shown in a block diagram form.

In this specification, a base station has a meaning as a terminal node of a network that directly communicates with a terminal. In this document, a specific operation described as performed by a base station may be performed by an upper node of the base station in some case. That is, in a network configured with a plurality of network nodes including the base station, it will become apparent that various operations performed for communication with the terminal may be performed by a base station or other network nodes other than the base station. A Base Station (BS) may be replaced with a term such as a fixed station, a Node B, an evolved-NodeB (eNB), a base transceiver system (BTS), and an Access Point (AP). Further, the 'terminal' may be fixed or may have mobility and may be replaced with a term such as a User Equipment (UE), a Mobile Station (MS), a User terminal (UT), a Mobile Subscriber Station (MSS), a Subscriber Station (SS), an Advanced Mobile Station (AMS), a Wireless terminal (WT), a Machine-Type Communication (MTC) device, a Machine-to-Machine (M2M) device, and a Device-to-Device (D2D) device.

Hereinafter, a downlink (DL) means communication from the BS to the terminal, and an uplink (UL) means communication from the terminal to the base station. In the downlink, a transmitter may be a portion of the base station, and the receiver may be a portion of the terminal. In the uplink, the transmitter may be a portion of the terminal, and the receiver may be a portion of the base station.

Specific terms used in the following description are provided for understanding of the present invention, and use of such a specific term may be changed in other forms without deviating from the spirit and scope of the present invention.

The following technology may be used for various wireless access systems such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). The CDMA may be implemented with radio technology such as universal terrestrial radio access (UTRA) or CDMA2000. The TDMA may be implemented with radio technology such as global system for mobile communications (GSM)/general packet radio service (GPRS)/enhanced data rates for GSM evolution (EDGE). The OFDMA may be implemented with radio technology such as IEEE 802.11 (Wi-Fi), IEEE 802.16 (WiMAX), IEEE 802-20, and E-UTRA (evolved UTRA). The UTRA is a portion of a universal mobile telecommunications system (UMTS). 3rd generation partnership project (3GPP) long term evolution (LTE) is a portion of an evolved UMTS (E-UMTS) using E-UTRA and adapts OFDMA in a downlink and adapts SC-FDMA in an uplink. LTE-advanced (A) is innovation of 3GPP LTE.

Exemplary embodiments of the present invention may be supported by standard documents that describe at least one of IEEE 802, 3GPP, and 3GPP2, which are wireless access systems. That is, in exemplary embodiments of the present invention, steps or portions that are not described to clearly expose the spirit and scope of the present invention may be supported by the documents. Further, entire terms of this document may be described by the standard document.

For clear description, 3GPP LTE/LTE-A is mainly described, but a technical characteristic of the present invention is not limited thereto.

Terms that may be used in this document are defined as follows.

Universal Mobile Telecommunications System (UMTS): 3-Generation mobile communication technology based on Global System for Mobile Communication (GSM) and developed by 3GPP, Evolved Packet System (EPS): A network system configured with an Evolved Packet Core (EPC), which is a packet switched core network based on an Internet Protocol (IP) and an access network such as LTE and UTRAN. The EPS is a network of a form in which the UMTS is innovated.

NodeB: Base station of an UMTS network. The NodeB is installed outdoor and covers a macro cell.

eNodeB: Base station of an EPS network. The eNodeB is installed outdoor and covers a macro cell.

UE: User device. The UE may be referred to as a term such as a terminal, a Mobile Equipment (ME), and a Mobile Station (MS). Further, the UE may be a device that can carry such as a notebook computer, a mobile phone, a Personal Digital Assistant (PDA), a smart phone, and a multimedia device or may be a device that cannot carry such as a Personal Computer (PC) and a vehicle mounting device. In MTC related contents, the UE may indicate an MTC terminal.

IP Multimedia Subsystem (IMS): Subsystem that provides a multimedia service based on IP.

International Mobile Subscriber Identity (IMSI): Internationally uniquely allocated user identifier in a mobile communication network.

Public Land Mobile Network (PLMN): A network configured as an object to provide a mobile communication service to individuals. The PLMN may be divided and configured on an operator basis.

Non-Access Stratum (NAS): A functional layer for transmitting and receiving a traffic message and signaling between a terminal and a core network at UMTS and EPS protocol stacks. The NAS has a main function of supporting mobility of the terminal and supporting a session management procedure that establishes and maintains IP connection between the terminal and a PDN GW.

Hereinafter, the present invention will be described based on the defined terms.

System to which the present invention can be applied

FIG. 1 illustrates an Evolved Packet System (EPS) to which the present invention can be applied.

A network structure diagram of FIG. 1 simply illustrates a structure of an EPS including an Evolved Packet Core (EPC).

An EPC is a core element of System Architecture Evolution (SAE) for enhancing a performance of 3GPP technologies. The SAE corresponds to a research subject that determines a network structure that supports mobility between various kinds of networks. The SAE has a target that provides an optimized packet-based system that supports various wireless access technologies based on, for example, an IP and that provides a more enhanced data transmission ability.

Specifically, the EPC is a core network of an IP mobile communication system for a 3GPP LTE system and may support a packet-based real time and non-real time service. In an existing mobile communication system (i.e., second generation or third generation mobile communication system), a function of a core network was implemented through two distinguished sub-domains of Circuit-Switched (CS) for voice and Packet-Switched (PS) for data. However, in an innovated 3GPP LTE system of the third generation mobile communication system, sub-domains of CS and PS were unified into a single IP domain. That is, in the 3GPP LTE system, connection between terminals having an IP capability may be formed through an IP-based base station (e.g., evolved Node B (eNodeB)), an EPC, an application domain (e.g., IMS). That is, the EPC is an essential structure in implementing an end-to-end IP service.

The EPC may include various constituent elements, and FIG. 1 illustrates a Serving Gateway (SGW) (or S-GW), a Packet Data Network Gateway (PDN GW) (or PGW or P-GW), a Mobility Management Entity (MME), a Serving General Packet Radio Service (GPRS) Supporting Node (SGSN), and an enhanced Packet Data Gateway (ePDG) corresponding to a portion of the various constituent elements.

The SGW operates as a boundary point between a radio access network (RAN) and a core network and is an element that performs a function of maintaining a data path between the eNodeB and the PDN GW. Further, when the terminal moves over an area served by the eNodeB, the SGW performs a function of a local mobility anchor point. That is, for mobility within a Universal Mobile Telecommunications System (Evolved-UMTS) Terrestrial Radio Access Network defined after 3GPP release-8) (E-UTRAN), packets may be routed through the SGW. Further, the SGW may function as an anchor point for mobility with another 3GPP network (RAN defined before 3GPP release-8, for example, UTRAN or Global System for Mobile Communication (GSM)/Enhanced Data rates for Global Evolution (EDGE) Radio Access Network (GERAN)).

The PDN GW corresponds to a termination point of a data interface toward a packet data network. The PDN GW may support policy enforcement features, packet filtering, and charging support. Further, the PDN GW may perform an anchor point function for mobility management with an unreliable network such as a 3GPP network and a non-3GPP network (e.g., an Interworking Wireless Local Area Network (I-WLAN), a Code Division Multiple Access (CDMA) network or a reliable network such as a Wimax).

In an illustration of a network structure of FIG. 1, the SGW and the PDN GW are configured as a separate gateway, but two gateways may be implemented according to a single gateway configuration option.

The MME is an element that performs signaling and control functions for supporting access to network connection of the terminal, allocation of a network resource, tracking, paging, roaming, and handover. The MME controls control plane functions related to a subscriber and session management. The MME manages many eNodeBs and performs signaling for selection of a conventional gateway for handover of another 2G/3G network. Further, the MME performs a function of security procedures, terminal-to-network Session Handling, and idle terminal location management.

The SGSN handles entire packet data such as user mobility management and authentication of another 3GPP network (e.g., GPRS network).

The ePDG functions as a security node of an unreliable non-3GPP network (e.g., I-WLAN, WiFi hotspot).

Referring to FIG. 1, the UE having an IP capability may access to an IP service network (e.g., IMS) in which a provider (i.e., operator) provides via various elements within the EPC based on 3GPP access and non-3GPP access.

Further, FIG. 1 illustrates various reference points (e.g., S1-U, S1-MME). In the 3GPP system, a concept link that connects two functions existing at different functional entities of an E-UTRAN and an EPC is defined to a reference point. Table 1 represents a reference point of FIG. 1. In addition to an illustration of Table 1, various reference points may exist according to a network structure.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to the UE mobility and if the Serving GW needs to connect to a non-collocated PDN GW for the required PDN connectivity. |
| S11 | Reference point of the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among reference points of FIG. 1, S2a and S2b correspond to a non-3GPP interface. S2a is a reference point that provides related control and mobility resource between a reliable non-3GPP access and PDN GW to a user plane. S2b is a reference point that provides related control and mobility support between ePDG and PDN GW to a user plane.

FIG. 2 illustrates an example of a network structure of an evolved universal terrestrial radio access network (E-UTRAN) to which the present invention can be applied.

The E-UTRAN system is an innovated system of an existing UTRAN system and may be, for example, a 3GPP LTE/LTE-A system. The communication network is widely disposed to provide various communication services such as a voice (e.g., Voice over Internet Protocol (VoIP)) through IMS and packet data.

Referring to FIG. 2, the E-UMTS network includes an E-UTRAN, an EPC, and at least one UE. The E-UTRAN is configured with eNBs that provide control plane and user plane protocols to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs a function of context transfer between the eNBs, the control of a user plane tunnel between a source eNB and a target eNB, transfer of a handover related message, and uplink load management.

The eNB is connected to the UE through a wireless interface and is connected to an Evolved Packet Core (EPC) through an S1 interface.

An S1 user plane interface (S1-U) is defined between the eNB and a serving gateway (S-GW). An S1 control plane interface (S1-MME) is defined between the eNB and a mobility management entity (MME). The S1 interface performs an Evolved Packet System (EPS) bearer service management function, a non-access stratum (NAS) signaling transport function, network sharing, and a MME load balancing function. The S1 interface supports many-to-many-relation between the eNB and the MME/S-GW.

The MME may perform various functions of NAS signaling security, Access Stratum (AS) security control, Core Network (CN) Inter-CN signaling for supporting mobility between 3GPP access networks, IDLE mode UE reachability (including execution and control of paging retransmission), Tracking Area Identity (TAI) management (for idle and active mode terminal), PDN GW and SGW selection, MME selection for handover in which the MME is changed, SGSN selection for handover to a 2G or 3G 3GPP access network, roaming, authentication, a bearer management function including dedicated bearer establishment, and Public Warning System (PWS) (including an Earthquake and Tsunami Warning System (ETWS) and Commercial Mobile Alert System (CMAS)) message transmission support.

FIG. 3 illustrates a structure of an E-UTRAN and an EPC in a wireless communication system to which the present invention can be applied.

Referring to FIG. 3, the eNB may perform a function of selection of a gateway (e.g., MME), routing to a gateway for radio resource control (RRC) activation, scheduling and transmission of a broadcast channel (BCH), dynamic resource allocation to the UE in an uplink and a downlink, and mobility control connection in an LTE ACTIVE state. As described above, a gateway within the EPC may perform a function of origination, LTE IDLE state management, ciphering of a user plane, a System Architecture Evolution (SAE) bearer control, and ciphering and integrity protection of NAS signaling.

FIG. 4 illustrates a radio interface protocol structure between an UE and an E-UTRAN in a wireless communication system to which the present invention can be applied.

FIG. 4A illustrates a wireless protocol structure of a control plane, and FIG. 4B illustrates a wireless protocol structure of a user plane.

Referring to FIG. 4, layers of a wireless interface protocol between the UE and the E-UTRAN may be divided into a first layer L1, a second layer L2, and a third layer L3 based on subordinate 3 layers of an open system interconnection (OSI) standard model widely known in the art of a communication system. The wireless interface protocol between the UE and the E-UTRAN is horizontally formed with a physical layer, a data link layer, and a network layer and is vertically divided into a protocol stack user plane for transmitting data information and a control plane, which is a protocol stack for transferring signaling.

The control plane is a transmitting path of control messages in which the UE and the network use to manage a call. The user plane means a path that transmits data, for example, voice data or Internet packet data generated in an application layer. Hereinafter, each layer of a control plane and a user plane of a wireless protocol will be described.

By using a physical channel, a physical layer (PHY), which is a first layer L1 provides an information transfer service to a superordinate layer. The physical layer is connected to a medium access control (MAC) layer located at a superordinate level through a transport channel, and data are transmitted between the MAC layer and the physical layer through the transport channel. The transport channels are classified according to a method and feature in which data are transmitted through a wireless interface. Data are transmitted between different physical layers and between a physical layer of a transmitting terminal and a physical layer of a receiving terminal through the physical channel. The physical layer is modulated with an orthogonal frequency division multiplexing (OFDM) method and uses a time and a frequency as a radio resource.

There are several physical control channels used in a physical layer. The physical downlink control channel (PDCCH) notifies the UE of resource allocation of a paging channel (PCH) and a downlink shared channel (DL-SCH) and hybrid automatic repeat request (HARQ) information related to an uplink shared channel (UL-SCH). Further, the PDCCH may transmit UL grant that notifies resource allocation of uplink transmission to the UE. A physical control format indicator channel (PDFICH) notifies the UE of the number of OFDM symbols using for PDCCHs and is transmitted to every subframe. A physical HARQ indicator channel (PHICH) transmits a HARQ acknowledge (ACK)/non-acknowledge (NACK) signal in response to uplink transmission. A physical uplink control channel (PUCCH) transmits uplink control information such as HARQ ACK/NACK, a scheduling request, and a channel quality indicator (CQI) of downlink transmission. The physical uplink shared channel (PUSCH) transmits an UL-SCH.

A MAC layer of the second layer L2 provides a service to a radio link control (RLC) layer, which is a superordinate layer through a logical channel. Further, the MAC layer includes a mapping function between the logical channel and the transport channel and a multiplexing/demultiplexing function to a transport block provided to a physical channel on a transport channel of a MAC service data unit (SDU) that belongs to the logical channel.

An RLC layer of the second layer L2 supports reliable data transmission. A function of the RLC layer includes concatenation, segmentation, and reassembly of an RLC SDU. In order to guarantee various quality of services (QoS) in which a radio bearer (RB) requires, the RLC layer provides three operation modes of a transparent mode (TM), an unacknowledged mode (UM), and an acknowledge mode (AM). An AM RLC provides error correction through an automatic repeat request (ARQ). When the MAC layer performs an RLC function, the RLC layer may be included as a function block of an MAC layer.

A packet data convergence protocol (PDCP) layer of the second layer L2 performs a transfer function of user data in a user plane and a header compression and ciphering function. In order to efficiently transmit an Internet protocol (IP) packet such as Internet protocol version 4 (IPv4) or Internet protocol version 6 (IPv6) through a wireless interface having a small bandwidth, a header compression function means a function of reducing an IP packet header size having a relatively large size and that contains unnecessary control information. A function of a PDCP layer in the control plane includes transfer of control plane data and ciphering/integrity protection.

A radio resource control (RRC) layer located at a lowermost portion of a third layer L3 is defined to only a control plane. The RRC layer performs a function of controlling a radio resource between the UE and the network. For this reason, the UE and the network exchange an RRC message through the RRC layer. The RRC layer controls a logical channel, a transport channel, and a physical channel in relation to a configuration, a reconfiguration, and release of radio bearers. For data transmission between the UE and the network, the radio bearer means a logical path provided by the second layer L2. A configuration of a radio bearer means prescription of a feature of a wireless protocol layer and a channel in order to provide a specific service and a configuration of each detailed parameter and operation method. The radio bearer may be again divided into two of signaling RB (SRB) and data RB (DRB). The SRB is used as a path that transmits an RRC message at the control plane, and the DRB is used as a path that transmits user data at the user plane.

A non-access stratum (NAS) layer located as a superordinate layer of the RRC layer performs a function of session management and mobility management.

One cell constituting a base station is set to one of bandwidths such as 1.25, 2.5, 5, 10, and 20 Mhz to provide a downlink or uplink transmission service to several UEs. Different cells may be set to provide different bandwidths.

A downlink transport channel that transmits data from the network to the UE includes a broadcast channel (BCH) that transmits system information, a PCH that transmits a paging message, and a DL-SCH that transmits user traffic or a control message. Traffic or a control message of downlink multicast or a broadcasting service may be transmitted through the DL-SCH or through a separate downlink multicast channel (MCH). An uplink transport channel that transmits data from the UE to the network includes a random access channel (RACH) that transmits an initial control message and an uplink shared channel (UL-SCH) that transmits user traffic or a control message.

The logical channel is a superordinate channel of the transport channel and is mapped to the transport channel. The logical channel may be divided into a control channel for transfer of control area information and a traffic channel for transfer of user area information. The control channel includes a broadcast control channel (BCCH), a paging control channel (PCCH), a common control channel (CCCH), a dedicated control channel (DCCH), and a multicast control channel (MCCH). The traffic channel includes a dedicated traffic channel (DTCH) and a multicast traffic channel (MTCH). The PCCH is a downlink channel that transfers paging information and is used when a network does not know a cell to which the UE belongs. The CCCH is used by the UE that does not have RRC connection to the network. The MCCH is a point-to-multipoint downlink channel used for transferring Multimedia Broadcast and Multicast Service (MBMS) control information from the network to the UE. The DCCH is a point-to-point bi-directional channel used by the UE having RRC connection that transfers dedicated control information between the UE and the network. The DTCH is a point-to-point channel used for only one UE in order to transfer user information that can exist at an uplink and a downlink. The MTCH is a point-to-multipoint downlink channel in order to transfer traffic data from the network to the UE.

In uplink connection between the logical channel and the transport channel, the DCCH may be mapped to the UL-SCH, the DTCH may be mapped to the UL-SCH, and the CCCH may be mapped to the UL-SCH. In downlink connection between the logical channel and the transport channel, the BCCH may be mapped to the BCH or the DL-SCH, the PCCH may be mapped to the PCH, the DCCH may be mapped to the DL-SCH, the DTCH may be mapped to the DL-SCH, the MCCH may be mapped to the MCH, and the MTCH may be mapped to the MCH.

FIG. 5 illustrates a structure of a physical channel in a wireless communication system to which the present invention can be applied.

Referring to FIG. 5, the physical channel transfers signaling and data through a radio resource configured with at least one subcarrier in a frequency domain and at least one symbol in a time domain.

One subframe having a length 1.0 ms is configured with a plurality of symbols. Specific symbol(s) (e.g., a first symbol of the subframe) of the subframe may be used for a PDCCH. The PDCCH transmits information (e.g., resource block) about a dynamically allocated resource and a Modulation and Coding Scheme (MCS).

Random Access Procedure

Hereinafter, a random access procedure providing in an LTE/LTE-A system will be described.

Because the UE does not have RRC Connection to the base station, when the UE performs initial access in an RRC idle state, the random access procedure is performed when performing an RRC connection re-establishment procedure.

In the LTE/LTE-A system, in a process of selecting a random access preamble (RACH preamble), the UE provides both a contention based random access procedure that randomly selects and uses one preamble and a non-contention based random access procedure in which a base station allocates to only a specific UE within a specific set.

FIG. 6 illustrates a contention based random access procedure in a wireless communication system to which the present invention can be applied.

(1) Msg 1 (Message 1)

First, the UE randomly selects one random access preamble (RACH preamble) at a set of random access preambles instructed through system information or a handover command and selects and transmits a physical RACH (PRACH) resource that can transmit the random access preamble.

The base station, having received a random access preamble from the UE decodes the preamble and acquires an RA-RNTI. The RA-RNTI related to the PRACH in which the random access preamble is transmitted is determined according to a time-frequency resource of a random access preamble in which a corresponding UE transmits.

(2) Msg 2 (Message 2)

The base station transmits a random access response addressed with the RA-RNTI acquired through a preamble on a message 1 to the UE. The random access response may include an RA preamble index/identifier, UL grant that notifies an uplink wireless resource, a Temporary Cell RNTI (TC-RNTI), and a time alignment command (TAC). The TAC is information that addresses a time synchronization value in which the base station sends to maintain uplink time alignment to the UE. The UE updates uplink transmission timing using the time synchronization value. When the UE updates time synchronization, the UE starts or restarts a time alignment timer. UL grant includes uplink resource allocation and transmit power command (TPC) used for transmission of a scheduling message (a message 3) to be described later. The TPC is used in determination of transmission power for a scheduled PUSCH.

After the UE transmits a random access preamble, the base station attempts reception of a random access response thereof within a random access response window addressed through system information or handover command, detects a masked PDCCH with the RA-RNTI corresponding to the PRACH, and receives a PDSCH addressed by the detected PDCCH. Random access response information may be transmitted in a form of a MAC packet data unit (MAC PDU), and the MAC PDU may be transferred through the PDSCH.

When the UE successfully receives a random access response having the same random access preamble index/identifier as that of a random access preamble transmitted to the base station, the UE stops monitoring of a random access response. However, until a random access response window is terminated, when the UE does not receive a random access response message or when the UE does not receive an effective random access response having the same random access preamble index as that of a random access preamble transmitted to the base station, it is regarded that reception of the random access response is failed and then the UE may retransmit the preamble.

(3) Msg 3 (Message 3)

When the UE receives an effective random access response, the UE processes each information included in the random access response. That is, the UE applies TAC and stores a TC-RNTI. Further, the UE transmits data stored at a buffer of the UE or newly generated data to the base station using UL grant.

In initial access of the UE, an RRC Connection Request generated in the RRC layer and transferred through the CCCH may be included and transmitted in the message 3, and in an RRC connection re-establishment procedure, an RRC Connection Re-establishment Request generated at the RRC layer and transferred through the CCCH may be included and transmitted in the message 3. Further, the message 3 may include a NAS access request message.

The message 3 should include an identifier of the UE. There are two methods of including an identifier of the UE. In a first method, when the UE already has an effective cell identifier (C-RNTI) allocated from a corresponding cell before the random access procedure, the UE transmits a cell identifier thereof through an uplink transmitting signal corresponding to the UL grant. However, when the UE does not have an effective cell identifier (C-RNTI) allocated from a corresponding cell before the random access procedure, the UE transmits a message 3 including a unique identifier (e.g., S-TMSI or random number) thereof. The unique identifier is generally longer than the C-RNTI.

When the UE transmits data corresponding to the UL grant, the UE starts a contention resolution timer.

(4) Msg 4 (Message 4)

When the base station receives the C-RNTI of a corresponding UE through the message 3 from the UE, the base station transmits a message 4 to the UE using the received C-RNTI. However, when the base station receives the unique identifier (i.e., S-TMSI or random number) from the UE through the message 3, the base station transmits the message 4 to the UE using a TC-RNTI allocated to the corresponding UE in a random access response. For example, the message 4 may include RRC Connection Setup.

The UE transmits data including an identifier thereof through UL grant included in the random access response and awaits an instruction of the base station in order to resolute contention. That is, in order to receive a specific message, the UE attempts reception of a PDCCH. There are two methods of receiving the PDCCH. As described above, in the message 3 transmitted to correspond to the UL grant, when an identifier thereof is a C-RNTI, the UE attempts reception of the PDCCH using the C-RNTI, and when the identifier is an unique identifier (i.e., S-TMSI or random number), the UE attempts reception of the PDCCH using a TC-RNTI included in the random access response. Thereafter, in the former case, before the contention resolution timer is terminated, when the UE receives the PDCCH through the C-RNTI thereof, the UE determines that a random access procedure has been normally performed and terminates the random access procedure. In the latter case, before the contention resolution timer is terminated, when the UE receives the PDCCH through the TC-RNTI, the UE determines data in which a PDSCH addressed by the PDCCH transfers. When a unique identifier thereof is included in the data, the UE determines that a random access procedure has been normally performed and terminates the random access procedure. The UE acquires a C-RNTI through the message 4 and the UE and the network transmit and receive a dedicated message using the C-RNTI.

In an operation in a non-contention based random access process, a random access procedure is terminated with only first message transmission and second message transmission unlike a contention-based random access process of FIG. 6. However, before the UE transmits a random access preamble to the base station with the message 1, the UE receives allocation of the random access preamble from the base station, transmits the allocated random access preamble to the base station with the message 1, and receives a random access response from the base station and thus the random access procedure is terminated.

Handover Procedure

1. Mobility Management in ECM-CONNECTED

The Intra-E-UTRAN-Access Mobility Support for UEs in ECM-CONNECTED handles all necessary steps for Handover procedures, like processes that precede the final HO decision on the source network side (control and evaluation of UE and eNB measurements taking into account certain UE specific roaming and access restrictions), preparation of resources on the target network side, commanding the UE to the new radio resources and finally releasing resources on the (old) source network side. It contains mechanisms to transfer context data between evolved nodes, and to update node relations on C-plane and U-plane.

DC specific procedures, like processes that precede the final decision for a certain configuration of a SeNB (control and evaluation of UE and network side measurements), preparation of respective resources on the network side of a SeNB, commanding the UE to the new radio resources configuration for a second connection and, if applicable, finally releasing resources of a SeNB. It contains mechanisms to transfer UE- and bearer-context data between involved nodes, and to update node relations on C-plane and U-plane.

In E-UTRAN RRC_CONNECTED state, network-controlled UE-assisted handovers and DC specific activities are performed and various DRX cycles are supported.

The UE makes measurements of attributes of the serving and neighbor cells to enable the process:

There is no need to indicate neighboring cells to enable the UE to search and measure a cell i.e. E-UTRAN relies on the UE to detect the neighboring cells;

For the search and measurement of inter-frequency neighboring cells, at least the carrier frequencies need to be indicated;

The E-UTRAN signals reporting criteria for event-triggered and periodical reporting;

An NCL can be provided by the serving cell by RRC dedicated signalling to handle specific cases for intra- and inter-frequency neighboring cells. This NCL contains cell specific measurement parameters (e.g. cell specific offset) for specific neighboring cells;

Black lists can be provided to prevent the UE from measuring specific neighboring cells.

For the UE measuring discovery signals (i.e. CRS and/or CSI-RS) of the serving and neighbor cells, the E-UTRAN indicates the measurement configuration to the UE, including the measurement timing configuration of the discovery signals.

Depending on whether the UE needs transmission/reception gaps to perform the relevant measurements, measurements are classified as gap assisted or non-gap assisted. A non-gap assisted measurement is a measurement on a cell that does not require transmission/reception gaps to allow the measurement to be performed. A gap assisted measurement is a measurement on a cell that does require transmission/reception gaps to allow the measurement to be performed. Gap patterns (as opposed to individual gaps) are configured and activated by RRC.

2. Handover

The intra E-UTRAN HO of a UE in RRC_CONNECTED state is a UE-assisted network-controlled HO, with HO preparation signalling in E-UTRAN:

Part of the HO command comes from the target eNB and is transparently forwarded to the UE by the source eNB;

To prepare the HO, the source eNB passes all necessary information to the target eNB (e.g. E-RAB attributes and RRC context):

When CA is configured and to enable SCell selection in the target eNB, the source eNB can provide in decreasing order of radio quality a list of the best cells and optionally measurement result of the cells.

When DC is configured, the source MeNB provides the SCG configuration (in addition to the MCG configuration) to the target MeNB.

Both the source eNB and UE keep some context (e.g. C-RNTI) to enable the return of the UE in case of HO failure;

UE accesses the target cell via RACH following a contention-free procedure using a dedicated RACH preamble or following a contention-based procedure if dedicated RACH preambles are not available:

the UE uses the dedicated preamble until the handover procedure is finished (successfully or unsuccessfully);

If the RACH procedure towards the target cell is not successful within a certain time, the UE initiates radio link failure recovery using a suitable cell;

No ROHC context is transferred at handover;

ROHC context can be kept at handover within the same eNB.

3. C-Plane Handling

The preparation and execution phase of the HO(Handover) procedure is performed without EPC involvement, i.e. preparation messages are directly exchanged between the eNBs. The release of the resources at the source side during the HO completion phase is triggered by the eNB. In case an RN is involved, its DeNB relays the appropriate S1 messages between the RN and the MME (S1-based handover) and X2 messages between the RN and target eNB (X2-based handover); the DeNB is explicitly aware of a UE attached to the RN due to the S1 proxy and X2 proxy functionality. The figure below depicts the basic handover scenario where neither MME nor Serving Gateway changes:

FIG. 7 illustrates an intra-MME/Serving Gateway HO(Handover) procedure.

Below is a more detailed description of the intra-MME/Serving Gateway HO procedure:

0. The UE context within the source eNB contains information regarding roaming and access restrictions which were provided either at connection establishment or at the last TA update.

1. The source eNB configures the UE measurement procedures according to the roaming and access restriction information and e.g. the available multiple frequency band information. Measurements provided by the source eNB may assist the function controlling the UE's connection mobility.

2. A MEASUREMENT REPORT is triggered and sent to the eNB.

3. The source eNB makes decision based on MEASUREMENT REPORT and RRM information to hand off the UE.

4. The source eNB issues a HANDOVER REQUEST message to the target eNB passing necessary information to prepare the HO at the target side (UE X2 signalling context reference at source eNB, UE S1 EPC signalling context reference, target cell ID, KeNB*, RRC context including the C-RNTI of the UE in the source eNB, AS-configuration, E-RAB context and physical layer ID of the source cell+short MAC-I for possible RLF (Radio Link Failure) recovery). UE X2/UE S1 signalling references enable the target eNB to address the source eNB and the EPC. The E-RAB context includes necessary RNL and TNL addressing information, and QoS profiles of the E-RABs.

5. Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

Steps 7 to 16 provide means to avoid data loss during HO.

7. The target eNB generates the RRC message to perform the handover, i.e. RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8. The source eNB sends the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRCConnectionReconfiguration message including the mobilityControlInformation, UE performs synchronisation to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10. The target eNB responds with UL allocation and timing advance.

11. When the UE has successfully accessed the target cell, the UE sends the RRCConnectionReconfigurationComplete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin sending data to the UE.

12. The target eNB sends a PATH SWITCH REQUEST message to MME to inform that the UE has changed cell.

13. The MME sends a MODIFY BEARER REQUEST message to the Serving Gateway.

14. The Serving Gateway switches the downlink data path to the target side. The Serving gateway sends one or more "end marker" packets on the old path to the source eNB and then can release any U-plane/TNL resources towards the source eNB.

15. The Serving Gateway sends a MODIFY BEARER RESPONSE message to MME.

16. The MME confirms the PATH SWITCH REQUEST message with the PATH SWITCH REQUEST ACKNOWLEDGE message.

17. By sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

18. Upon reception of the UE CONTEXT RELEASE message, the source eNB can release radio and C-plane related resources associated to the UE context. Any ongoing data forwarding may continue.

When an X2 handover is used involving HeNBs and when the source HeNB is connected to a HeNB GW, a UE CONTEXT RELEASE REQUEST message including an explicit GW Context Release Indication is sent by the source HeNB, in order to indicate that the HeNB GW may release of all the resources related to the UE context.

U(User)-Plane Handling

The U-plane handling during the Intra-E-UTRAN-Access mobility activity for UEs in ECM-CONNECTED takes the following principles into account to avoid data loss during HO:

During HO preparation U-plane tunnels can be established between the source eNB and the target eNB. There is one tunnel established for uplink data forwarding and another one for downlink data forwarding for each E-RAB for which data forwarding is applied. In the case of a UE under an RN performing handover, forwarding tunnels can be established between the RN and the target eNB via the DeNB.

During HO execution, user data can be forwarded from the source eNB to the target eNB. The forwarding may take place in a service and deployment dependent and implementation specific way.

Forwarding of downlink user data from the source to the target eNB should take place in order as long as packets are received at the source eNB from the EPC or the source eNB buffer has not been emptied.

During HO completion:

The target eNB sends a PATH SWITCH message to MME to inform that the UE has gained access and MME sends a MODIFY BEARER REQUEST message to the Serving Gateway, the U-plane path is switched by the Serving Gateway from the source eNB to the target eNB.

The source eNB should continue forwarding of U-plane data as long as packets are received at the source eNB from the Serving Gateway or the source eNB buffer has not been emptied.

For RLC-AM bearers:

During normal HO not involving Full Configuration:

For in-sequence delivery and duplication avoidance, PDCP SN is maintained on a bearer basis and the source eNB informs the target eNB about the next DL PDCP SN to allocate to a packet which does not have a PDCP sequence number yet (either from source eNB or from the Serving Gateway).

For security synchronisation, HFN is also maintained and the source eNB provides to the target one reference HFN for the UL and one for the DL i.e. HFN and corresponding SN.

In both the UE and the target eNB, a window-based mechanism is needed for duplication detection.

The occurrence of duplicates over the air interface in the target eNB is minimised by means of PDCP SN based reporting at the target eNB by the UE. In uplink, the reporting is optionally configured on a bearer basis by the eNB and the UE should first start by transmitting those reports when granted resources in the target eNB. In downlink, the eNB is free to decide when and for which bearers a report is sent and the UE does not wait for the report to resume uplink transmission.

The target eNB re-transmits and prioritizes all downlink PDCP SDUs forwarded by the source eNB (i.e. the target eNB should send data with PDCP SNs from X2 before sending data from S1), with the exception of PDCP SDUs of which the reception was acknowledged through PDCP SN based reporting by the UE.

The UE re-transmits in the target eNB all uplink PDCP SDUs starting from the first PDCP SDU following the last consecutively confirmed PDCP SDU i.e. the oldest PDCP SDU that has not been acknowledged at RLC in the source, excluding the PDCP SDUs of which the reception was acknowledged through PDCP SN based reporting by the target.

During HO involving Full Configuration:
The following description below for RLC-UM bearers also applies for RLC-AM bearers. Data loss may happen.

For RLC-UM bearers:
The PDCP SN and HFN are reset in the target eNB.
No PDCP SDUs are retransmitted in the target eNB.
The target eNB prioritizes all downlink PDCP SDUs forwarded by the source eNB if any (i.e. the target eNB should send data with PDCP SNs from X2 before sending data from S1).
The UE PDCP entity does not attempt to retransmit any PDCP SDU in the target cell for which transmission had been completed in the source cell. Instead UE PDCP entity starts the transmission with other PDCP SDUs.

Session Management

The session management is responsible for the setup of the IP or non-IP traffic connectivity for the UE as well as managing the user plane for that connectivity.

Hereinafter, packet data unit (PDU) session registration information and functions related to session management will be described as a solution for session management.

FIG. 8 illustrates Session management functions in a wireless communication system to which the present invention can be applied.

The PDU Connectivity Service is provided by a PDU Session.

Properties of a PDU Session:
The next generation (NextGen) systems will support connectivity towards different types of Data Network (DN) (e.g. Internet, IMS, corporate/private) and they need to be distinguished by some kind of identifier. The DN is identified by a DN name.
Each PDU Session is associated with a PDU Session type that indicates what PDU type(s) are carried by the PDU Session. The PDU Session Type may be of IP Type, Ethernet Type or non-IP Type.

The following functions are included as part of the solution for Session Management:
Packet forwarding;
Packet screening, i.e. the capability to check that the UE is using the exact IP address/prefix that was assigned to the UE;
Session control, i.e. the overall functionality to handle Session Management (SM) signalling and managing PDU Sessions;
Selection of user plane (UP) function.

The Session Management functionality is used to provide PDU Connectivity Service for different PDU types, including Internet Protocol (IP), Ethernet and non-IP PDU types. Certain session management functionality is PDU type specific, such as e.g. IP address allocation for IP-based PDU types. However, to achieve a generic and re-usable NextGen system it is desirable that most functionality is common for all different PDU types. The following assumptions apply for the solution:
The session management procedures (e.g. for establishing new PDU sessions and modifying/terminating established PDU sessions) are common to all PDU types. However, some information carried by the session management signalling may be PDU specific (e.g. IP addresses in case of IP-based PDU types).
The solution does not require PDU-specific user-plane transport between Access Network (AN) and the core network (CN).

For an IP-based Data Networks, also the following functions are part of the solution for Session Management:
UE IP address allocation.
For an IP-based Data Network, the PDU Session can be identified by one or more allocated IP address(es)/prefix(es) and the DN identity.

The allocation of Session Management functions to UE, AN and CN are shown in the FIG. 8. Note that the FIG. 8 does not assume any specific grouping of these functions into logical Network Functions/Network Entities. This is instead assumed to be handled as part of work on the overall architecture.

In 3GPP SA2, Per-PDU session/QoS class/node level tunneling schemes and SDN based approach are proposed as the User Plane (UP) protocol model of Next Generation (NextGen) Session Management.

1) Solution 1: UP Protocol Model—Per QoS Class Tunnel Protocol

In this option there is one tunnel per Quality of Service (QoS) class and Packet Data Unit (PDU) Session between a pair of Network Functions (NFs) (i.e., processing functions in a network), e.g. between a Radio Access Network (RAN) node and a UP function in the Core Network (CN) or between two UP functions in the CN. This option is similar to how it works for EPC where each QoS class (bearer) can have separate outer Internet Protocol (IP) headers and separate encapsulation (GTP-U: GPRS Tunneling Protocol User Plane) headers.

FIG. 9 illustrates Per QoS class tunnel protocol in a wireless communication system to which the present invention can be applied.

This solution has the following additional properties:
The receiving endpoint can use the outer IP header in combination with encapsulation header fields to determine the PDU Session and QoS class of the packet.
New tunnel parameters need to be established for each QoS class.
At mobility, signalling of tunneling info per QoS class (although several QoS tunnels can be handled in the same message)
Overlapping UE IP-version 4 (IPv4) addresses supported
Different PDU types (IP, Ethernet, non-IP) supported
End-user payload "layer" decoupled from the transport layer, allowing different technologies in the transport layer.

2) Solution 2: UP Protocol Model—Per PDU Session Tunnel Protocol

In this option there is one tunnel per PDU Session between a pair of NFs e.g. between a RAN node and a UP function in the CN and between two UP functions in the CN. All QoS classes of a session share the same outer IP header, but the encapsulation header may carry QoS markings.

FIG. 10 illustrates Per PDU session tunnel protocol in a wireless communication system to which the present invention can be applied.

This solution has the following additional properties:
The receiving endpoint uses an identifier in the encapsulation header, possibly in combination with outer IP header, to determine what session the tunneled PDU belongs to.
Common signaling for all QoS classes in mobility
Overlapping UE IPv4 addresses supported
Different PDU types (IP, Ethernet, non-IP) supported
End-user payload "layer" decoupled from the transport layer, allowing different technologies in the transport layer.

3) Solution 3: UP Protocol Model—Per Node-Level Tunnel

In this option there is a common tunnel for all traffic between each pair of NFs e.g. between a RAN node and a UP function in the CN or between two UP functions in the CN.

FIG. 11 illustrates One tunnel per destination in a wireless communication system to which the present invention can be applied.

This solution has the following additional properties:
- There is no identification of the PDU Session within the outer IP header or the encapsulation header. Instead the endpoint needs to use information in the end-user PDU to identify the session, e.g. the UE IP address in case of PDU type IP.
- In case one Access Node (AN) connects with one UP accessing multiple Data Networks (DNs), there should be per-Node-per-DN tunnels between the AN and the UP function.
- For PDU type IP, the PDU session traffic is identified based on UE IP address. This requires that UE IP addresses are unique in one DN to allow unambiguous traffic identification.
- For Ethernet type PDU, a unique ID to identify session at UP function and RAN node is required, which is created per PDU type. The ID is located in PDU header like UE IP address for IP type PDU.
- The encapsulation header may or may not be needed, e.g. to carry an identifier for QoS purposes.
- In case a node/function supports multiple IP addresses there may be a need to signal the tunnel endpoint addresses in order to direct the traffic to the right IP address of the node/function due to e.g. load balancing.
- End-user payload "layer" decoupled from the transport layer, allowing different technologies in the transport layer.
- For one AN node, there may be multiple tunnels connecting to different User Plane Gateways (GWs). The node-level tunnel applies to UEs that are stationary and hence do not move. Therefore, the operator can ensure via configuration the assignment of non-overlapping IP addresses within one DN to the UEs belonging to the same Node-level tunnel.

FIG. 12 illustrates Scenario with fixed wireless and mobile terminals in a wireless communication system to which the present invention can be applied.

A scenario where this solution may apply is when "a fixed wireless terminal" connects to the network, e.g., a Internet of Things (IoT) UE, or a Customer-Premises Equipment (CPE) UE providing fixed-network comparable bandwidth as the access service for the "last one mile". Such fixed wireless terminals need almost no movement or may also not be allowed (e.g., per-subscription) to move.

The fixed-UE scenarios are characterized by the large number of connections (e.g., IoT case) and the heavy UP traffics (e.g., CPE case). To simplify the tunnel, an "aggregated" node-level tunnel between the NextGen Access node and the UP Functions could be used.

When a UE attaches to the network or sets up a PDU session to one DN, the Control Plane-Authentication function (CP-AU) authorizes the UE type (e.g., a type of fixed wireless UE) and identify whether AN node level tunnel applies. If so, the Control Plane (CP) will determine the corresponding tunnel for the PDU session based on information such as DN name, the tunnel end point information (e.g., UP IP addresses) or the AN node Identifier (ID) provided by the AN.

The UEs using the same AN node-level tunnel should be connected to the same CP Session Management function (CP-SM). The AN node can identify the UE's traffic through the tunnel information (e.g., outer IP header) and the UE's IP address.

FIG. 13 illustrates a UE attach to the network by an AN node-level tunnel in a wireless communication system to which the present invention can be applied.

The "User Data" (e.g. HSS, Subscriber Repository Function etc) is the data repository of information related to session management and user subscription for authorization, user identities. It may be a standalone network function or may be collocated with some network function.

The "CP-AU" is a function (or network entity) in the core network that performs UE authentication process and interacts with User Data (or Subscriber Repository Function) for retrieving authentication materials.

The "CP-SM" is a function (or network entity) in the core network that is responsible for establishing, maintaining and terminating PDU Sessions on-demand for the UE in the NextGen system architecture.

1. The UE sends Attach Request to the AN node (e.g. base station, eNB, etc). The UE type is included in the signalling (similar as RRC message) associated with the attach request.

2. The AN node may recognize the UE type and incorporate the node-level tunnel selection assistance information (i.e., tunnel end point IP addresses, AN node ID) together with the Attach Request message send to CP-AU.

3. The CP-AU verifies the PDU type and User subscription data such as UE type to authenticate the UE.

4. The CP-AU sends Create Session Request message to the CP-SM.

5. The CP-SM select the UP function based on the information such as the DN Name, tunnel selection assistance information provided by AN. CP-SM assigns UE IP address corresponding to the UP function. CP-SM then request the AN to setup resources for the session.

6. The CP-SM function setup the user plane with the UP function, i.e., notifies the assigned UE IP address, indicate the tunnel used to the AN and the corresponding traffic handling policy for this Session.

7. The CP-SM sends Create Session Response to CP-AU. The message contains the UE IP address.

8. The CP-AU send Attach complete to the UE.

Likewise, the above-describe Per node level tunnel model may be applied to a service in which a fixed wireless terminal is used like IoT. Such a fixed wireless terminal may correspond to IoT UE which has almost no movement or does not allow movement. Such a per-node level tunneling may be easily applied when a multiple of non-mobile UEs desire to be provided the same DN service.

Management of Tunneling in Per-Node Level Tunneling

Likewise, three models (Per QoS class level tunnel protocol, Per PDU session level tunnel protocol (or per (PDU) session level tunneling), and Per Node-level tunnel (or Per node level tunneling)) may be presented as UP protocol models, and the use case of each model and necessary parameters are different.

According to each characteristic of UP protocol model and the description on the use case, the difference between the above per session level tunneling and per node-level tunneling is as follows.

According to the per session level tunneling, the session and the tunnel between AN (network node in charge of the function of the above-described AN, e.g., a base station, etc.) and UP function (i.e., the network node in charge of the above-described UP function, e.g., S-GW, P-GW, etc.) are mapped by 1:1, and thus the AN and the UP function may check the tunnel through the session ID.

In contrast, according to the per-node level tunneling, the session and the tunnel are mapped by N:1 due to the per-DN per-PDU-type tunneling between the AN and the UP function. Namely, the UP function and the AN check the tunnel through the DN and the PDU-type. Hence, the per-node level tunneling may be useful in an area where there is no mobility or almost no mobility and a multiple of fixed wireless terminals (e.g., IoT device, etc.) are intensively deployed.

Namely, the per-node level tunneling is a method of managing sessions of UEs being provided services from the same DN (i.e., APN (access point name) and PDN (packet data network)) from the same DN between the AN and the UP function as one tunnel.

In the present specification, it is assumed that the core network and AN mode may support all of the three models. Here, AN node may correspond to the concept corresponding to the base station (eNB). Yet, even when the AN supports all of the three tunnel models, the following problem may occur.

For example, connection to APN1 may be generated through AN2 by generation of a mobility event (e.g., a handover event) while the UE is connected to the APN1 through the per-node level tunneling of AN1. In this case, if there is no per-node level tunnel connected to PAN1 in AN2, there is an ambiguity of the condition for determination about whether a new tunnel for connecting the UE and the APN1 should be made. Further, when AN2 does not per-node level tunnel towards APN1 but has another tunnel (e.g., per (PDU) session level tunnel and/or per QoS class level tunnel), AN2 has ambiguity of the condition for determination about whether UE and APN1 should be connected using such a tunnel. If such an existing tunnel is reused, AN2 should change the tunnel model by making the UE perform the session create procedure, and thus there is a problem that an overload or delay is generated. Here, APN means PDN identifier (i.e., PDN identifier) and means a letter string for indicating or distinguishing PDN.

Hence, the present specification proposes appropriate criteria for determining whether a new AN (or target AN) should generate a new tunnel for the UE or use the already generated tunnel when a mobility event occurs in the UE in order to minimize an overload or delay according to such a tunnel model change. In particular, the present invention proposes a method of making a new tunnel according to the tunnel model and the user plan function (node) of the UE by the target AN or changing the tunnel model of the existing UE to another tunnel model without interaction of the UE and the CP when a mobility event (e.g., a handover) that should be connected to a new AN by the UE is generated. Hereinafter, the description centers on the per-node level tunneling, but the present invention is not limited thereto and may be applied to other tunnel models. Meanwhile, in the present specification, the per node level tunnel may be defined as a common connection tunnel which is generated in the node unit for all traffics between the target AN and the user plan function (node) (e.g., P-GW), the per-session level tunnel may be defined as a common connection tunnel which is generated in the PDU session unit between the target AN and the user plan function (node) (e.g., P-GW), and the per-QoS class level tunnel may be defined as a common connection tunnel which is generated in the QoS class unit between the target AN and the user plan function (node) (e.g., P-GW) (may also be called as "target APN (access point name)").

FIG. 14 is a flowchart illustrating a method of supporting an access network (AN) handover operation by a target AN according to an embodiment of the present invention. In the present embodiment, a situation that the AN connected to the UE is handed over from the source AN to the target AN due to the occurrence of the mobility event.

1. AN to which the UE is connected due to the occurrence of the mobility event may be changed from the source AN to the target AN. In this case, the source AN selects the target AN based on the location of the UE and transmits the handover request to the target AN. At this time, the source AN may enable the following necessary information to be included in the handover request so as to be transmitted to the target AN.

Necessary information to prepare the HO(Handover) at the target AN (Data Network Name, User Plane Function (or target APN) IP address, information on the session, UE X2 signalling context reference at source eNB/AN/cell, UE S1 EPC signalling context reference, target eNB/AN/cell ID, KeNB, RRC context including the C-RNTI of the UE in the source eNB/AN/cell, AS-configuration, E-RAB context and physical layer ID of the source eNB/AN/cell and/or short MAC-I for possible RLF recovery).

2. The target AN may determine whether the service of the UE is possible using the per-node level tunnel which exists based on the necessary information received from the source AN. Specifically, the target AN may recognize the target user plane function node (or target APN (or DN)) to which the UE should be connected based on necessary information and may determine whether the per-node level tunnel for the target user plane function node (or target APN (or DN)) has already been generated. In the target AN, information on which tunneling model is necessary may have been configured in advance in order to be connected to the user plane function node (or target APN (or DN)). For example, information about the tunneling model corresponding to target user plane function node (or target APN (or DN)) information and/or information on the tunneling model corresponding to the IP address of the specific user plane function corresponding to the target user plane function node (or target APN (or DN)), etc. may have been configured in advance.

In this case, the target AN may recognize the tunneling model corresponding to the IP address of the user plane function and/or the target user plane function node (or target APN (or DN)) of the necessary information and may determine whether the corresponding tunneling function has already been generated. For example, if the target user plane function node (or target APN (or DN)) is IoT DN, the target AN may recognize that it should be connected by the per-node level tunnel and may determine whether the corresponding per-node level tunnel has already been generated.

If there is a per-node level tunnel for the corresponding user plane function node (or target APN (or DN)), it may be determined whether the UE service through the corresponding tunnel is possible by recognizing the UE number which may be supported by the corresponding tunnel and the UE number which is currently supported.

3. When the UE service is possible using the already existing per-node level tunnel, the target AN may enable the UE session to be included in the already existing per-node level tunnel. As a result, the UE may be connected to the target user plane function node through the per-node level tunnel of the target AN.

4. If the UE service is not possible using the already existing per-node level tunnel, the target AN may determine whether the generation of a new per-node level tunnel for the UE is necessary (or the tunnel model of the UE may need to be changed to another model) on the basis of the predetermined condition for determination. At this time, the following examples may exist as the predetermined conditions for determination.

For example, the target AN may consider the session characteristic for connecting the UE and the target user plane function node as the condition for determination. For example, when the (PDU) session of the UE is a delay-tolerant session (or a session which is not sensitive to the delay or a session which is not strict in the delay condition), the target AN may generate a new per-node level tunnel, and when the session of the UE is not a delay-tolerant session (or a session which is sensitive to the delay, a session which is strict in the delay condition), the target AN may change the tunnel mode of the UE to a tunnel model other than the per-node level tunnel. Here, other models may correspond to another type of tunnel (e.g., per QoS class level tunnel and/or per PDU session level tunnel) which has already been generated for the user plane function node. Such a condition for determination has been set in consideration of the fact that a longer delay is generated in generating a new per-node level tunnel than reusing the already existing another type of tunnel.

As another embodiment, the target AN may consider the area, to which the target AN itself belongs, as a condition for determination. Specifically, when the area, where the UE may be connected to the APN through the per-node level tunnel, has been specified, whether the target AN handed over by the UE is included in the corresponding area may be set as a condition for the determination. If the target AN is included in the corresponding area, a new per-node level tunneling may be generated for the UE so as to connect the target user plane function node with the UE. Otherwise, the target AN may connect the target user plane function node and the UE by changing the tunnel model of the UE to the per-session level tunnel or per-QoS class level tunnel in the per-node level tunnel. At this time, the setting for the specific area supporting the per-node level tunnel may be performed by the CP (e.g., P-GW, S-GW) or APN.

As another embodiment, the target AN may consider the non-static configuration of the network operator as a condition for determination. Namely, when generating a new per-node level tunnel costs more than using already existing another tunnel model, the target AN may reuse the existing another tunneling model. To this end, the target AN may perform an operation of changing the tunneling model of the UE to another model, and the detailed description thereof will be described later with reference to FIG. 15. When generating a new per-node level tunnel costs less than using the already existing another tunnel model, the target AN may generate a new per-node level tunnel. The costs which are considered at this time may include load status (e.g., UE/session number) and signaling overhead, costs when generating as another tunneling mode, etc.

5. When it is determined that generation of a new per-node level tunnel is necessary according to a predetermined condition for determination (or when it is determined that it is not necessary to change the tunnel model of the UE to another model), the target AN may generate a new per-node level tunnel for UE and connect the UE and the APN (or DN) through the corresponding tunnel.

6. When the target AN determines that the tunnel model of the UE needs to be changed to another model according to the predetermined condition for determination (or it is determined that the generation of a new per-node level tunnel is not necessary), the target AN may change the tunneling model of the UE to the per-session level tunnel or per-QoS class level tunnel. At this time, a specific procedure for changing to another tunneling model will be described later with reference to FIG. 15.

7. Lastly, if steps 3, 5 and 6 are completed, the target AN may transmit a handover response ACK to the source AN in response to the handover request transmitted from the source AN. Thereafter, the procedure may be performed sequentially from step 7 of the flowchart of the above-described FIG. 7.

FIG. 15 is a flowchart illustrating a method of changing a tunneling model of a target AN according to an embodiment of the present invention. The flowchart illustrates a more specific embodiment for step 6 of FIG. 14.

1. When the target AN determines that the tunnel model for connecting the UE and the target user plane function node (in the case of the present embodiment, corresponding to SM UP) is changed, the tunnel model change request (including information of session which needs to change UE IE and tunnel model and/or information on the tunnels in which the target AN is connected to the target user plane function node) may be transmitted to the SM CP (i.e., the network node in charge of the above-described SM CP function, e.g., MME, etc.).

2. SM CP may select one of the tunnel models which have been generated/established in the current target AN in consideration of information on the session of the UE (e.g., session requirements and/or UE subscription, etc.) and information on the tunnel which has been generated/established in the target AN (e.g., information on the tunnel which has been generated/established in target AN and/or support tunnel model of target AN) through the received tunnel model change request.

The SM CP may generate a tunnel corresponding to the selected tunneling model and transmit the tunnel model change notification including information related to the generated tunnel to the SM UP. At this time, the transmitted tunnel model change notification may include information on the target AN, information on the tunneling model about the newly generated tunnel, PDU session type, UE ID and/or tunnel assistance information as information related to the tunnel.

3. SM UP (i.e., the above-described network node in charge of the user plane function, e.g., target user plane function node) may generate a new tunnel directed from SM CP based on the received tunnel model change notification and transmit tunnel model change Ack indicating generation of a new tunnel to the SM CP.

4. The SM CP may transmit the tunnel model change response including information on the SM UP having transmitted tunnel model change Ack to AN, to the target AN.

5. The target AN may transmit a handover request Ack indicating the completion of the handover to the target AN, to the source AN. Thereafter, the steps of the flowchart of FIG. 7 may be sequentially started from step 7.

According to the embodiments of FIGS. 14 and 15, the UE generates a new tunnel within the network or makes a change to the tunneling model optimized to the UE and the target AN, and thus there is an effect that the complexity of the handover to the target AN and the delay time are minimized.

Device to which the Present Invention can be Applied

FIG. 16 is a block diagram illustrating a configuration of a communication device according to an exemplary embodiment of the present invention.

Referring to FIG. 16, a wireless communication system includes a network node 1610 and a plurality of UEs 1620.

The network node 1610 includes a processor 1611, a memory 1612, and a communication module 1613. The processor 1611 implements a function, a process and/or a method suggested in FIGS. 1 to 15. Layers of a wired/wireless interface protocol may be implemented by the processor 1611. The memory 1612 is connected to the processor 1611 to store various information for driving the processor 1611. The communication module 1613 is connected to the processor 1611 to transmit and/or receive a wired/wireless signal. The network node 1610 may be, for example, a base station, an MME, a HSS, a SGW, a PGW, a SCEF, a SCS/AS, and a Prose Function. Particularly, when the network node 1610 is a base station, the communication module 1613 may include a radio frequency (RF) unit for transmitting/receiving a wireless signal.

The terminal 1620 includes a processor 1621, a memory 1622, and a communication module (or RF unit) 1623. The processor 1621 implements a function, a process and/or a method suggested in FIGS. 1 to 20. Layers of a wireless interface protocol may be implemented by the processor 1621. The memory 1622 is connected to the processor 1621 to store various information for driving the processor 1621. The communication module 1623 is connected to the processor 1621 to transmit and/or receive a wireless signal.

The memories 1612 and 1622 may exist at the inside or the outside of the processors 1611 and 1621 and may be connected to the processors 1611 and 1621, respectively, by well-known various means. Further, the network node 1610 (a case of a base station) and/or the UE 1620 may have a single antenna or multiple antennas.

FIG. 17 is a block diagram illustrating a configuration of a communication device according to an exemplary embodiment of the present invention.

Particularly, FIG. 17 is a block diagram specifically illustrating the UE of FIG. 16.

Referring to FIG. 17, the UE may include a processor (or a digital signal processor (DSP)) 1710, a RF module (or RF unit) 1735, a power management module 1705, an antenna 1740, a battery 1755, a display 1715, a keypad 1720, a memory 1730, a Subscriber Identification Module (SIM) card 1725 (this element may be selected), a speaker 1745, and a microphone 1750. The UE may include a single antenna or multiple antennas.

The processor 1710 implements a function, a process and/or a method suggested in FIGS. 1 to 16. A layer of a wireless interface protocol may be implemented by the processor 1710.

The processor 1710 is connected to the processor 1710 and stores information related to operation of the processor 1710. The memory 1730 may exist at the inside or the outside of the processor 1710 and may be connected to the processor 1710 by well-known various means.

The user inputs, for example, instruction information such as a phone number by pressing (touching) a button of the keypad 1720 or by voice activation using the microphone 1750. The processor 1710 processes to perform an appropriate function such as reception of such instruction information and calling with a phone number. Operational data may be extracted from the SIM card 1725 or the memory 1730. Further, for user recognition and convenience, the processor 1710 may display instruction information or driving information on the display 1715.

The RF module 1735 is connected to the processor 1710 to transmit and/or receive an RF signal. In order to start communication, the processor 1710 transfers, for example, instruction information to the RF module 1735 in order to transmit a wireless signal constituting voice communication data. The RF module 1735 is configured with a receiver and a transmitter in order to receive and transmit a wireless signal. The antenna 1740 performs a function of transmitting and receiving a wireless signal. When receiving a wireless signal, the RF module 1735 may transfer a signal in order to process by the processor 1710 and may convert a signal with a base band. The processed signal may be converted to audible or readable information output through the speaker 1745.

In the foregoing exemplary embodiments, constituent elements and characteristics of the present invention are combined in a predetermined form. Unless phrases explicitly represent, it should be considered that each constituent element or characteristic is selective. Each constituent element or characteristic may be executed in a form that does not combined with other constituent elements or characteristics. Further, by combining some configurations and/or characteristics, an exemplary embodiment of the present invention may be configured. The order of operations described in exemplary embodiments of the present invention may be changed. Some configurations or characteristics of any exemplary embodiment may be included in another exemplary embodiment or may be replaced with a configuration or a characteristic corresponding to another exemplary embodiment. It will become apparent that claims that are not in an explicit cited relation in the claims may configure an exemplary embodiment by combination and may be included in new claim by amendment after filing.

An exemplary embodiment of the present invention may be implemented by various means, for example, hardware, firmware, software, or combinations thereof. When implementing by hardware, an exemplary embodiment of the present invention may be implemented by at least one application specific integrated circuits (ASICs), digital signal processors (DSPs), digital signal processing devices (DSPDs), programmable logic devices (PLDs), field programmable gate arrays (FPGAs), a processor, a controller, a microcontroller, and a microprocessor.

When implementing by firmware or software, an exemplary embodiment of the present invention may be implemented in a form of a module, procedure, and function that perform the foregoing function or operation. A software code may be stored at a memory to be driven by a processor. The memory may be located at the inside or the outside of the processor and may transmit and receive data to and from the processor by already known various means.

It will become apparent to a person of ordinary skill in the art that the present invention may be embodied in different specific forms without deviating from essential features of the present invention. Therefore, it should be considered that the detailed description is not to limit the present invention but to illustrate it. Thus, it is intended that the present invention cover the modifications and variations of this invention provided they come within the scope of the appended claims and their equivalents.

According to the embodiments of the present invention, in order for a UE to be connected to a target user plane function node, a new tunnel is generated inside the network or it is changed to a tunneling model optimized to the UE and the target AN, and thus the complexity of a handover procedure to the target AN and the delay time can be minimized.

The effect of the present invention is not limited to the above-described effects and the other objects will be understood by those skilled in the art from the following description.

An exemplary embodiment of the present invention mainly describes an example applied to a 3GPP LTE/LTE-A system, but can be applied to various wireless communication systems other than the 3GPP LTE/LTE-A system.

What is claimed is:

1. A method for supporting an access network (AN) handover operation of a user equipment (UE) by a target AN, the method comprising:
   receiving, from the source AN, a handover request requesting a handover of an AN of the UE from a source AN to the target AN,
   wherein the UE is configured with a per node level tunnel, a per-session level tunnel and a per-QoS class level tunnel for connection to a target user plane function node,
   wherein the per node level tunnel is a common connection tunnel which is generated in the node unit for all traffics between the target AN and the target user plane function node,
   wherein the per-session level tunnel is a common connection tunnel which is generated in the packet data unit (PDU) session unit between the target AN and the user plan function node; and
   wherein the per-quality of services (QoS) class level tunnel is a common connection tunnel which is generated in the QoS class unit between the target AN and the user plan function node;
   determining whether a service provision through the per node level tunnel is possible for the UE;
   based on a predetermined condition, determining whether generation of a new per node level tunnel for the UE is necessary when it is determined that service provision is impossible using the per node level tunnel;
   based on determining that generation of a new per-node level tunnel is necessary according to the predetermined condition, generating the new per node level tunnel for the UE; and
   based on determining that the tunnel model of the UE needs to be changed to another model according to the predetermined condition, changing the tunnel model of the UE to the per-session level tunnel or the perQoS class level tunnel without interaction of the UE and the control plane (CP).

2. The method of claim 1, wherein the determining of whether a service provision through the per node level tunnel is possible for the UE comprises:
   determining whether a pre-generated per node level tunnel for the target user plane function node exists or not; and
   when the pre-generated per node level tunnel is determined to exist, checking a number of remaining UEs which are currently supportable by the per node level tunnel.

3. The method of claim 1, wherein the predetermined condition is a feature of a packet data unit (PDU) session between the UE and the target user plane function node.

4. The method of claim 3,
   when the PDU session between the UE and the target user plane function node is a delay tolerant session allowing a delay longer than a preset time, the target AN determines that generation of the new per node level tunnel is necessary, and
   when the PDU session between the UE and the target user plane function node is not a delay tolerant session, the target AN determines that the change of the tunnel model of the UE to the per-session level tunnel or the per-QoS class level tunnel is necessary.

5. The method of claim 1, wherein the predetermined condition is a location including the target AN.

6. The method of claim 5,
   when the location including the target AN corresponds to a location supporting the per node level tunnel, determining that generation of the new per node level tunnel is necessary; and
   when the location including the target AN does not correspond to a location not supporting the per node level tunnel, determining that generation of the new per node level tunnel is not necessary.

7. The method of claim 1, wherein the changing of the tunnel model of the UE to the per-session level tunnel or the per-QoS class level tunnel comprises:
   transmitting a tunnel model change request requesting a change to the per-session level tunnel or the per-QoS class level tunnel to a session management (SM) control plane (CP); and
   receiving a tunnel model change response indicating completion of a change to the per-session level tunnel or the per-QoS class level tunnel, from the SM CP.

8. The method of claim 7, wherein the tunnel model change request comprises identification information of the UE, information of PDU session which needs a change to the per-session level tunnel or the per-QoS class level tunnel and/or information on tunnels having been generated between the target AN and the target user plane function node.

9. The method of claim 1, further comprising:
   connecting the UE and the target user plane function node through a new per node level tunnel when the new per node level tunnel for the user equipment is generated based on a result of the determination.

10. The method of claim 1, further comprising transmitting, to the source AN, a handover request Ack (acknowledge) indicating completion of a handover to the target AN.

11. A target access network (AN) supporting an AN handover operation of a user equipment (UE) in a wireless communication system, the target AN comprising:
    a radio frequency (RF) unit including a transceiver for transmitting and receiving a wireless signal; and
    a processor operatively connected to the RF unit,
    wherein the processor is configured to:
    receive, from the source AN, a handover request requesting a handover of an AN of the UE from a source AN to the target AN,
    wherein the UE is configured with a per node level tunnel, a per-session level tunnel and a per-QoS class level tunnel for connection to a target user plane function node,
    wherein the per node level tunnel is a common connection tunnel which is generated in the node unit for all traffics between the target AN and the target user plane function node,
    wherein the per-session level tunnel is a common connection tunnel which is generated in the packet data unit (PDU) session unit between the target AN and the user plan function node, and
    wherein the per-quality of services (QoS) class level tunnel is a common connection tunnel which is generated in the QoS class unit between the target AN and the user plan function node;
    determine whether a service provision through the per node level tunnel is possible for the UE;
    based on a predetermined condition, determine whether generation of a new per node level tunnel for the UE is necessary when it is determined that service provision is impossible using the per node level tunnel;

based on determining that generation of a new per-node level tunnel is necessary according to the predetermined condition, generate the new per node level tunnel for the UE; and based on determining that the tunnel model of the UE needs to be changed to another model according to the predetermined condition, changing the tunnel model of the UE to the per-session level tunnel or the per-QoS class level tunnel without interaction of the UE and the control plane (CP).

12. The target AN of claim 11, wherein the predetermined condition is a feature of a packet data unit (PDU) session between the UE and the target user plane function node.

13. The target AN of claim 12, wherein the processor is configured:

when the PDU session between the UE and the target user plane function node is a delay tolerant session allowing a delay longer than a preset time, to determine that generation of the new per node level tunnel is necessary, and when the PDU session between the UE and the target user plane function node is not a delay tolerant session, to determine that the change of the tunnel model of the UE to the per-session level tunnel or the per-QoS class level tunnel is necessary.

14. The target AN of claim 13, wherein the predetermined condition is a location including the target AN.

15. The target AN of claim 14, wherein the processor is configured:

when the location including the target AN corresponds to a location supporting the per node level tunnel, to determine that generation of the new per node level tunnel is necessary, and when the location including the target AN does not correspond to a location not supporting the per node level tunnel, to determine that generation of the new per node level tunnel is not necessary.

* * * * *